United States Patent
Nakamura

(10) Patent No.: US 12,205,414 B2
(45) Date of Patent: Jan. 21, 2025

(54) VEHICLE CONFIGURED TO BE PROVIDED WITH OCCUPANT-DEPENDENT SETTING, AND VEHICLE SETTING SYSTEM

(71) Applicant: SUBARU CORPORATION, Tokyo (JP)

(72) Inventor: Ryota Nakamura, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 288 days.

(21) Appl. No.: 17/872,551

(22) Filed: Jul. 25, 2022

(65) Prior Publication Data
US 2023/0041270 A1    Feb. 9, 2023

(30) Foreign Application Priority Data
Aug. 3, 2021  (JP) ................ 2021-127476

(51) Int. Cl.
*G07C 5/00*   (2006.01)
*G07C 5/08*   (2006.01)
*H04L 9/40*   (2022.01)

(52) U.S. Cl.
CPC ............. *G07C 5/008* (2013.01); *G07C 5/085* (2013.01); *H04L 63/08* (2013.01)

(58) Field of Classification Search
CPC .......... G07C 5/008; G07C 5/085; G07C 9/27; G07C 9/257; G07C 2209/04; H04L 63/08; H04W 12/06; H04W 4/44
USPC ...................................................... 701/31.4
See application file for complete search history.

(56) References Cited

U.S. PATENT DOCUMENTS

| | | | |
|---|---|---|---|
| 8,943,187 B1* | 1/2015 | Saylor | G07C 9/00857 709/225 |
| 10,850,693 B1* | 12/2020 | Pertsel | G06V 20/597 |
| 11,040,619 B1* | 6/2021 | Martin | G06T 7/593 |
| 2004/0158373 A1 | 8/2004 | Nakaya | |
| 2016/0088086 A1* | 3/2016 | Cuddihy | H04L 67/12 455/41.2 |
| 2016/0264131 A1* | 9/2016 | Chan | B60W 60/00 |
| 2017/0011210 A1* | 1/2017 | Cheong | A61B 5/681 |
| 2019/0236385 A1* | 8/2019 | Nakamura | H04N 7/188 |
| 2019/0236388 A1* | 8/2019 | Nakamura | G06V 20/597 |

(Continued)

FOREIGN PATENT DOCUMENTS

JP    2004-243825 A    9/2004

*Primary Examiner* — Andrew R Dyer
(74) *Attorney, Agent, or Firm* — TROUTMAN PEPPER HAMILTON SANDERS LLP

(57) ABSTRACT

A vehicle setting system includes an occupant data acquisition processor, a server apparatus including a provisional generation processor, a provisional acquisition processor, and a setting processor. The occupant data acquisition processor acquires or estimates physical data regarding an occupant on board the vehicle, at least in a case with absence of a setting value for the occupant held in a vehicle memory of a vehicle. The provisional generation processor acquires the physical data regarding the occupant, and generates a provisional setting value for the relevant occupant. The provisional acquisition processor acquires the provisional setting value. The setting processor records, in a vehicle memory of the vehicle, the provisional setting value as the setting value for the occupant, and provides the vehicle with setting of the provisional setting value.

14 Claims, 12 Drawing Sheets

(56) References Cited

U.S. PATENT DOCUMENTS

| | | | |
|---|---|---|---|
| 2019/0265868 A1* | 8/2019 | Penilla | H04L 63/083 |
| 2019/0276031 A1* | 9/2019 | Hirose | B60W 50/0098 |
| 2020/0108795 A1* | 4/2020 | Chapin | G10L 17/00 |
| 2020/0180533 A1* | 6/2020 | Sakurada | H04W 4/40 |
| 2020/0233940 A1* | 7/2020 | Edwards | H04L 9/0637 |
| 2020/0239005 A1* | 7/2020 | Zijderveld | G06V 40/174 |
| 2020/0285871 A1* | 9/2020 | Tokizaki | B60R 21/013 |
| 2021/0016802 A1* | 1/2021 | Herzhauser | G06V 20/59 |
| 2021/0149397 A1* | 5/2021 | Shin | G06V 20/56 |
| 2021/0232642 A1* | 7/2021 | Ricci | A61B 5/0077 |

\* cited by examiner

VEHICLE CONFIGURED TO BE PROVIDED WITH OCCUPANT-DEPENDENT SETTING, AND VEHICLE SETTING SYSTEM

CROSS-REFERENCE TO RELATED APPLICATION

This application claims priority from Japanese Patent Application No. 2021-127476 filed on Aug. 3, 2021, the entire contents of which are hereby incorporated by reference.

FIELD OF THE INVENTION

The technology relates to a vehicle configured to be provided with occupant-dependent setting, and a vehicle setting system.

BACKGROUND

Some vehicles such as automobiles allow an occupant on board to adjust, for example, a seat position for their convenience.

In this case, the occupant has to adjust, for example, the seat position for their convenience every time they get in the vehicle.

One of possible countermeasures is to record a setting value set in the vehicle by the occupant, in a vehicle memory or a server apparatus described in Japanese Unexamined Patent Application Publication (JP-A) No. 2004-243825. Next time the occupant gets in the vehicle, the setting value is read from the vehicle memory or the server apparatus, to provide the vehicle with setting.

This saves the occupant from re-adjusting, for example, the seat position on their own every time they get in the vehicle.

SUMMARY

An aspect of the technology provides a vehicle setting system configured to record, in a vehicle memory of a vehicle, a setting value in accordance with an occupant to be on board the vehicle, and provide the vehicle with setting of the setting value. The vehicle setting system includes an occupant data acquisition processor, a server apparatus, a provisional acquisition processor, and a setting processor. The occupant data acquisition processor is configured to acquire or estimate physical data regarding the occupant on board the vehicle, at least in a case with absence of the setting value for the occupant on board the vehicle held in the vehicle memory of the vehicle. The server apparatus includes a provisional generation processor. The provisional generation processor is configured to acquire the physical data regarding the occupant related to processing by the occupant data acquisition processor, and generate a provisional setting value for the occupant. The provisional acquisition processor is to be disposed in the vehicle. The provisional acquisition processor is configured to acquire the provisional setting value generated by the provisional generation processor of the server apparatus. The setting processor is to be disposed in the vehicle. The setting processor is configured to record, in the vehicle memory, the provisional setting value acquired by the provisional acquisition processor, as the setting value for the occupant related to the processing by the occupant data acquisition processor, and provide the vehicle with setting of the provisional setting value.

An aspect of the technology provides a vehicle configured to be provided with occupant-dependent setting. The vehicle includes a vehicle memory, a setting processor, and a provisional acquisition processor. The vehicle memory is configured to hold a setting value to be set in the vehicle in accordance with an occupant to be on board the vehicle. The setting processor is configured to acquire the setting value for the occupant on board the vehicle from the vehicle memory and provide the vehicle with setting of the setting value. The provisional acquisition processor is configured to acquire a provisional setting value for the occupant on board the vehicle, at least in a case with absence of the setting value for the occupant on board the vehicle held in the vehicle memory. The setting processor is configured to record, in the vehicle memory, the provisional setting value acquired by the provisional acquisition processor, and provide the vehicle with setting of the provisional setting value.

An aspect of the technology provides a vehicle configured to be provided with occupant-dependent setting. The vehicle includes a vehicle memory and circuitry. The vehicle memory is configured to hold a setting value to be set in the vehicle in accordance with an occupant to be on board the vehicle. The circuitry configured to acquire the setting value for the occupant on board the vehicle from the vehicle memory and provide the vehicle with setting of the setting value. The circuitry is configured to acquire a provisional setting value for the occupant on board the vehicle, at least in a case with absence of the setting value for the occupant on board the vehicle held in the vehicle memory. The circuitry is configured to record the acquired provisional setting value in the vehicle memory, and provide the vehicle with setting of the provisional setting value.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
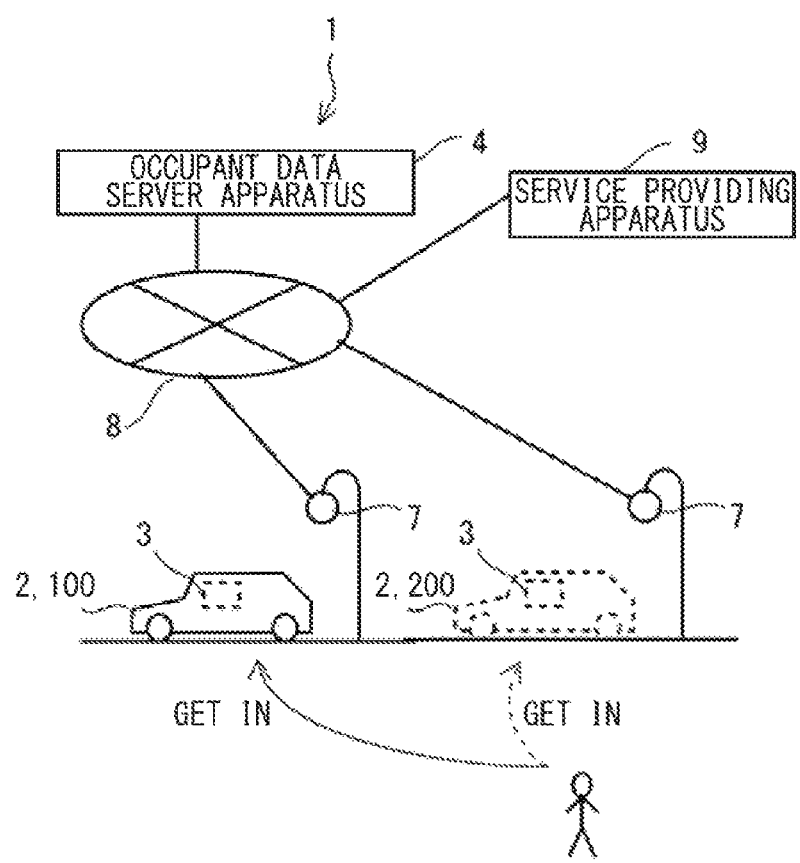
FIG. 1 is a schematic diagram of a vehicle setting system for an automobile according to a first embodiment of the technology.

Occupants do not continue to use one vehicle constantly. They sometimes stop using an old vehicle they have used so far, and begin using a new vehicle. They sometimes use multiple vehicles.

In a case where occupants begin using a new vehicle, they have to make a setting operation on the new vehicle they are going to use. Occupants have to make an operation, on the new vehicle, to newly adjust, for example, a seat position for their convenience.

Thus, there has been room for improvement for occupant-dependent setting in vehicles.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is a schematic diagram of a vehicle setting system 1 for an automobile according to a first embodiment of the technology.

The vehicle setting system 1 in FIG. 1 is configured to provide an automobile 2 with occupant-dependent setting. An occupant such as a driver gets in the automobile 2. The vehicle setting system 1 may include, without limitation, a control system 3 of the automobile 2, and an occupant data server apparatus 4. The occupant data server apparatus 4 is configured to perform data communication with the control system 3 of the automobile 2. In one embodiment of the technology, the automobile 2 may serve as a "vehicle" an occupant gets in.

An occupant who gets in the automobile 2 may carry an occupant terminal 5 described later and an occupant key. The occupant may approach the automobile 2 and get in the automobile 2. The single automobile 2 may be in shared use by a plurality of the occupants. In the occupant terminal 5, an application program for management or use of the automobile 2 may be installed. The occupant terminal 5, as with the occupant key, may be configured to carry out a control of unlocking the automobile 2 when the occupant approaches the automobile 2.

The control system 3 of the automobile 2 as a moving body may establish a communication path with a base station 7 around the automobile 2 and perform data communication with the occupant data server apparatus 4 through the base station 7 and a communication network 8. The base station 7 and the communication network 8 may include those for 5G provided by telecommunication carriers, or those for, for example, ADAS (Advanced Driver Assistance System) provided by, for example, public organizations.

Moreover, the control system 3 of the automobile 2 may be coupled to each of a plurality of service providing apparatuses 9 through the base station 7 and the communication network 8. The plurality of the service providing apparatuses 9 is used in the automobile 2 by the occupant. The control system 3 of the automobile 2 may transmit and receive service information to and from the plurality of the service providing apparatuses 9. FIG. 1 illustrates one of the service providing apparatuses 9 that provides such a network service. The plurality of the occupants who uses the automobile 2 may basically use network services provided by the different service providing apparatuses 9 from one another, in the automobile 2 they possibly share. Non-limiting examples of the network services may include telematics services, video and audio content provision services, sales services, settlement services, navigation services for route guidance and an automated driving control, information provision services such as tourist destinations, search provision services such as the World Wide Web, communication services such as telephones and conferences, online travel control services for, for example, a travel control of the automobile 2, and other application services. In a case where a user such as an occupant uses the network services, the user is often requested to obtain account data at each network service.

Figure 2:
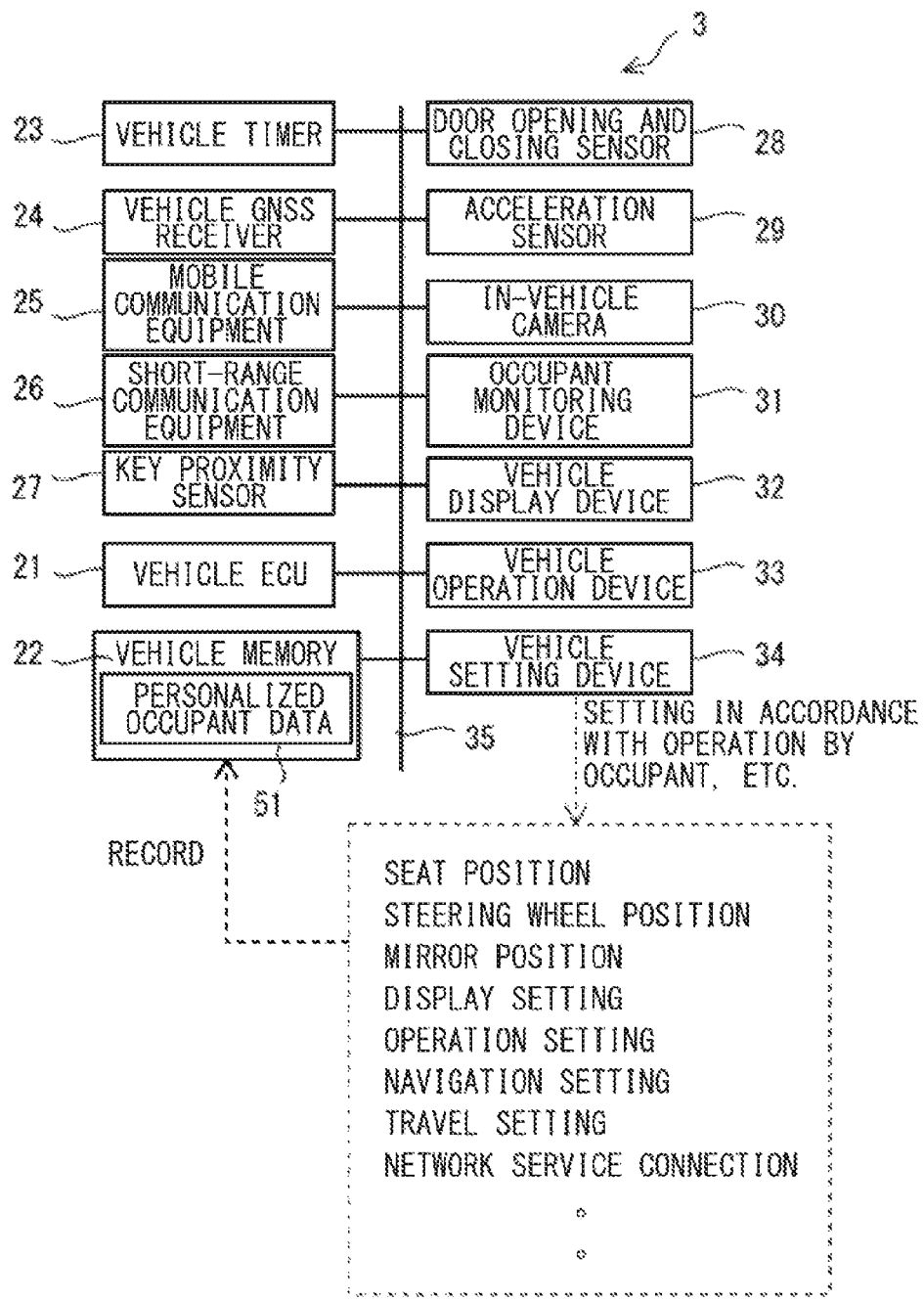
FIG. 2 is a block diagram of a control system of the automobile in FIG. 1.

FIG. 2 is a block diagram of the control system 3 of the automobile 2 in FIG. 1.

The control system 3 of the automobile 2 in FIG. 2 may include, without limitation, a vehicle ECU (Electronic Control Unit) 21, a vehicle memory 22, a vehicle timer 23, a vehicle GNSS (Global Navigation Satellite System) receiver 24, a mobile communication equipment 25, a short-range communication equipment 26, a key proximity sensor 27, a door opening and closing sensor 28, an acceleration sensor 29, an in-vehicle camera 30, an occupant monitoring device 31, a vehicle display device 32, a vehicle operation device 33, a vehicle setting device 34, and a vehicle network 35 to which these are coupled.

The vehicle network 35 may include, without limitation, a wired communication network for the automobile 2 in conformity with, for example, CAN (Controller Area Network) and LIN (Local Interconnect Network). The vehicle network 35 may include a communication network such as LAN, or a combination thereof. A portion of the vehicle network 35 may include a wireless communication network.

The vehicle GNSS receiver 24 may receive radio waves from GNSS satellites and generate a present position at which the automobile 2 is located, and the present time.

The vehicle timer 23 may measure time and the time. The time of the vehicle timer 23 may be calibrated by the present time of the vehicle GNSS receiver 24.

The mobile communication equipment 25 may establish, by wireless communication, a communication path with the base station 7 that includes the automobile 2 in its zone. This allows the mobile communication equipment 25 to perform data communication with the occupant data server apparatus 4 and the plurality of the service providing apparatuses 9 through the base station 7 and the communication network 8.

The mobile communication equipment 25 may directly communicate with the mobile communication equipment 25 of another automobile and establish the communication path with the base station 7 through the intermediary of the relevant automobile. This also allows the mobile communication equipment 25 to perform data communication with the occupant data server apparatus 4 and the plurality of the service providing apparatuses 9 through the mobile communication equipment 25 of the intermediary automobile, the base station 7, and the communication network 8.

The key proximity sensor 27 may detect an occupant key 6 carried by an occupant in or near the automobile 2, by specific short-range wireless communication. The occupant key 6 may have identification data different from other occupant keys 6. The identification data regarding the occupant key 6 may be used as occupant identification data. For example, upon detecting the occupant key 6, the key proximity sensor 27 may generate a signal to unlock doors of the automobile 2 and output the signal to the vehicle network 35. This allows the doors of the automobile 2 to be automatically unlocked, allowing the occupant to open and close the doors of the automobile 2 and get in the automobile 2, for example, by just coming near the automobile 2, without unlocking the doors on their own. Moreover, in a case where the key proximity sensor 27 no longer detects the occupant key 6 of the occupant who has got off, the key proximity sensor 27 may generate a signal to lock the doors of the automobile 2 and output the signal to the vehicle network 35. This allows the doors of the automobile 2 to be automatically locked.

The short-range communication equipment 26 may establish, by short-range wireless communication, a communication path with the occupant terminal 5 carried by the occupant in or near the automobile 2. Non-limiting examples of short-range wireless communication standards may include IEEE (Institute of Electrical and Electronics Engineers) 802.15.1 and IEEE 802.11/b/g. Non-limiting examples of the occupant terminal 5 may include a mobile phone terminal and a wearable terminal that are configured to be coupled to the base station 7 of the telecommunication carriers. The short-range communication equipment 26 may detect, authenticate, and be coupled to the occupant terminal 5 carried by the occupant in or near the automobile 2. This allows the short-range communication equipment 26 to perform data communication with the occupant terminal 5.

The application program installed in the occupant terminal 5 for the management and the use of the automobile 2 may have different identification data from other application programs. In this case, when the occupant terminal 5 in which the application program is installed approaches the automobile 2, the short-range communication equipment 26 may generate a signal to unlock the doors of the automobile 2 and output the signal to the vehicle network 35, as with the key proximity sensor 27. Moreover, in a case where the short-range communication equipment 26 no longer detects the occupant terminal 5 of the occupant who has got off, the short-range communication equipment 26 may generate a signal to lock the doors of the automobile 2 and output the signal to the vehicle network 35. This allows the doors of the automobile 2 to be automatically locked.

The door opening and closing sensor 28 may detect opening and closing of the unillustrated doors of the automobile 2. In a case where the automobile 2 includes a plurality of doors, e.g., a door on side on which a driver's seat is disposed and a door on side on which a passenger seat is disposed, the door opening and closing sensor 28 may be provided for each door.

The acceleration sensor 29 may detect an acceleration rate of the automobile 2 traveling. The acceleration sensor 29 may integrate the acceleration rate and detect a speed of the automobile 2 together.

The in-vehicle camera 30 is provided in the automobile 2 for imaging of an inside of the automobile 2. The in-vehicle camera 30 may be of a narrow angle configured to perform imaging of only the driver of the automobile 2, or alternatively, the in-vehicle camera 30 may be of a wide angle configured to perform imaging of an entire cabin. A wide-angle captured image may include, along with the driver, an occupant as a fellow passenger other than the driver in the automobile 2. The captured image of the in-vehicle camera 30 may include biometric data regarding, for example, appearance of the occupant.

The occupant monitoring device 31 may detect and identify the occupant on board the automobile 2, and monitor a state of the occupant, on the basis of, for example, the captured image of the in-vehicle camera 30. The occupant may sometimes become drowsy, look aside, or have an abnormal heart rate while on board. The occupant monitoring device 31 may monitor the biometric data corresponding to these conditions, to determine the biometric data in real time on the basis of the captured image of the in-vehicle camera 30. In a case where the automobile 2 includes a millimeter-wave sensor that sends out a millimeter-wave toward inside the automobile, the occupant monitoring device 31 may use a detection result of the occupant by the millimeter-wave sensor together with the captured image of the in-vehicle camera 30, to detect and identify the occupant on board the automobile 2, and monitor the state of the occupant.

The vehicle display device 32 and the vehicle operation device 33 may constitute an HMI (Human Machine Interface) for the occupant in the automobile 2.

The vehicle display device 32 may include, without limitation, a liquid crystal display monitor. The vehicle display device 32 may be disposed in front of the driver's seat or in a center console, in the cabin of the automobile 2. The vehicle display device 32 may display an image for the occupant's view. A display screen of the vehicle display device 32 may include, for example, a setting screen to provide the automobile 2 with setting, a navigation screen, a meter screen that indicates a state of the automobile 2, a connection screen to the network service, a screen to provide the network service, without limitation.

The vehicle operation device 33 may include, without limitation, a touchscreen disposed on the liquid crystal display monitor. The vehicle operation device 33 may further include, without limitation, buttons, a pointing device, and a keypad. In a case where the vehicle operation device 33 constitutes a non-contact HMI, the vehicle operation device 33 may detect an operation on the basis of a motion of the occupant in the captured image of the in-vehicle camera 30. The occupant may make an operation, on the vehicle operation device 33, to allow the vehicle display device 32 to display, for example, the setting screen. Thus, the occupant may make an operation, on the setting screen, to set an initial screen or screen transitions of the vehicle display device 32. In addition, the occupant may make an operation, on the vehicle operation device 33, to allow the vehicle display device 32 to display, for example, the connection screen to the network service. Thus, the occupant may make an operation, on the connection screen, to input the account data.

The vehicle setting device 34 may provide each part of the automobile 2 with the occupant-dependent setting. For example, in a case where the occupant gets in the automobile 2 and makes a setting operation on, for example, the setting screen, the vehicle setting device 34 may acquire a setting value and provide the automobile 2 with the setting. The vehicle setting device 34 may acquire data previously set by the occupant on board, from, for example, the vehicle ECU 21, and provide the automobile 2 with the setting. Non-limiting examples of the data to be set in the automobile 2 by the occupant on board the automobile 2 may include a seat position, a steering wheel position, a mirror position, display setting, operation setting, navigation setting, and travel setting.

The vehicle memory 22 may hold programs and data. The data to be held in the vehicle memory 22 may include, without limitation, various setting values and navigation data set by the occupant with the use of the vehicle operation device 33. In this case, the vehicle memory 22 may include, without limitation, an HDD (Hard Disk Drive) and/or an SSD (Solid State Disk) as a nonvolatile memory configured to hold data without power supply. The vehicle memory 22 may temporarily hold communication data transmitted and received by, for example, the mobile communication equipment 25 and the short-range communication equipment 26.

The vehicle ECU 21 may include, without limitation, a microcomputer. The vehicle ECU 21 may read the programs from the vehicle memory 22 and execute the programs. Thus, the vehicle ECU 21 may serve as a processor configured to make an overall operation control including the travel control of the automobile 2. The microcomputer may be integrated with, for example, the vehicle memory 22 and the vehicle timer 23.

The vehicle ECU 21 as the processor of the automobile 2 may make the travel control of the automobile 2 by, for example, automated driving.

The vehicle ECU 21 may generate the setting values on the basis of the setting operation made on the automobile 2 by the occupant with the use of the vehicle display device 32 and the vehicle operating device 33. The vehicle ECU 21 may record the setting values in the vehicle memory 22. In the vehicle memory 22, a plurality of the setting values regarding the occupant may be held as personalized occupant data. In the vehicle memory 22, a plurality of pieces of the personalized occupant data regarding the plurality of the occupants may be held. In this case, the vehicle ECU 21 is configured to read the setting values from the vehicle memory 22 and provide each part of the automobile 2 with the setting with the use of the vehicle setting device 34. In a case where the control system 3 of the automobile 2 is devoid of the vehicle setting device 34 configured to provide setting, the vehicle ECU 21 may provide each part of the automobile 2 with the setting on its own. This saves the occupant from making the setting operation every time they get in.

Figure 3:
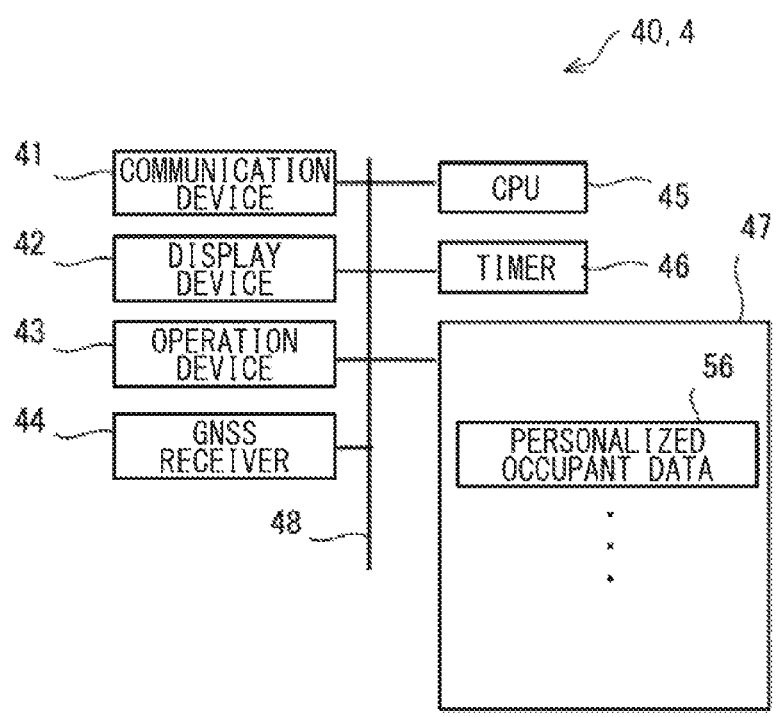
FIG. 3 is a block diagram of a computer apparatus that serves as an occupant data server apparatus in FIG. 1.

FIG. 3 is a block diagram of a computer apparatus 40 that serves as the occupant data server apparatus 4 in FIG. 1.

The computer apparatus 40 in FIG. 3 may include, without limitation, a communication device 41, a display device 42, an operation device 43, a GNSS receiver 44, a CPU 45, a timer 46, and a memory 47.

For example, in FIG. 1, the service providing apparatus 9, and the occupant terminal 5 and the occupant key 6 carried by the occupant may also include the computer apparatus 40 similar to FIG. 3.

The communication device 41 may be coupled to the communication network 8. The communication device 41 may transmit and receive communication data of the computer apparatus 40.

The display device 42 may include, without limitation, a liquid crystal display monitor. The display device 42 may provide an operator of the computer apparatus 40 with screen display.

The operation device 43 may include, without limitation, a keyboard and/or a pointing device. The operation device 43 may be operated by the operator of the computer apparatus 40.

The GNSS receiver 44 may receive the radio waves from the GNSS satellites and generate a position at which the computer apparatus 40 is located, and the present time.

The timer 46 may measure time and the time. The time of the timer 46 may be calibrated by the present time of the GNSS receiver 44.

The memory 47 may include, without limitation, non-volatile memory. The memory 47 may hold programs and data. For example, the memory 47 as the occupant data server apparatus 4 may hold programs and data to provide the automobile 2 with the setting.

The CPU 45 may include, without limitation, a microcomputer. The CPU 45 may read the programs from the memory 47 and execute the programs. Thus, the CPU 45 may serve as a processor configured to make an overall operation control of the computer apparatus 40.

As described, in the automobile 2 illustrated in FIG. 1, in a case where the occupant on board adjusts, for example, the seat position, the setting may be recorded in the vehicle memory 22. In a case where the occupant gets in again, the setting may be acquired from the vehicle memory 22 to provide the automobile 2 with the setting. This makes it possible to provide the automobile 2 with the occupant-dependent setting. It is possible to make the occupant-dependent setting available in the automobile 2.

In recent years, however, the automobile 2 may include, for example, the advanced mobile communication equipment 25. This makes it possible for the occupant to use, for example, the telematics service, the content service, and the sales service, while on board the automobile 2.

In such an automobile 2, after the occupant gets in the automobile 2, the occupant may adjust the seat position according to their physical constitution, and make an operation to establish connection to the various network services such as the telematics service.

This hinders the occupant from starting travel immediately after they get in the automobile 2.

In particular, in a case where the occupant wants to use a plurality of the network services while on board, the occupant has to make the operation to establish connection one by one to the plurality of the network services they want to use.

A possible countermeasure against such a situation may include allowing the automobile 2 to record the account data at the network services regarding each occupant in the vehicle memory 22 of the automobile 2 in FIG. 1. The account data may be read on the occasion of, for example, boarding, to allow the vehicle setting device 34 to establish the connection to the network services.

However, from the viewpoint of, for example, limitation on capacity of the vehicle memory 22 of the automobile 2 and data safety, it is not considered desirable to record all the account data at the network services regarding each occupant in the vehicle memory 22 of the automobile 2.

Thus, in this embodiment, as illustrated in FIG. 1, the occupant data server apparatus 4 is provided. As illustrated in FIG. 3, the personalized occupant data regarding the occupant of the automobile 2 may be held in the memory 47 of the occupant data server apparatus 4. The memory 47 of the occupant data server apparatus 4 may hold the personalized occupant data regarding the plurality of the occupants. Some kinds of the personalized occupant data, e.g., the account data at the settlement service, requires high safety management. Recording such data in the memory 47 of the occupant data server apparatus 4 instead of the vehicle memory 22 of the automobile 2 makes it possible to enhance data safety. The personalized setting values for each occupant to be on board the automobile 2 may be held in the memory 47 of the occupant data server apparatus 4.

Figure 4:
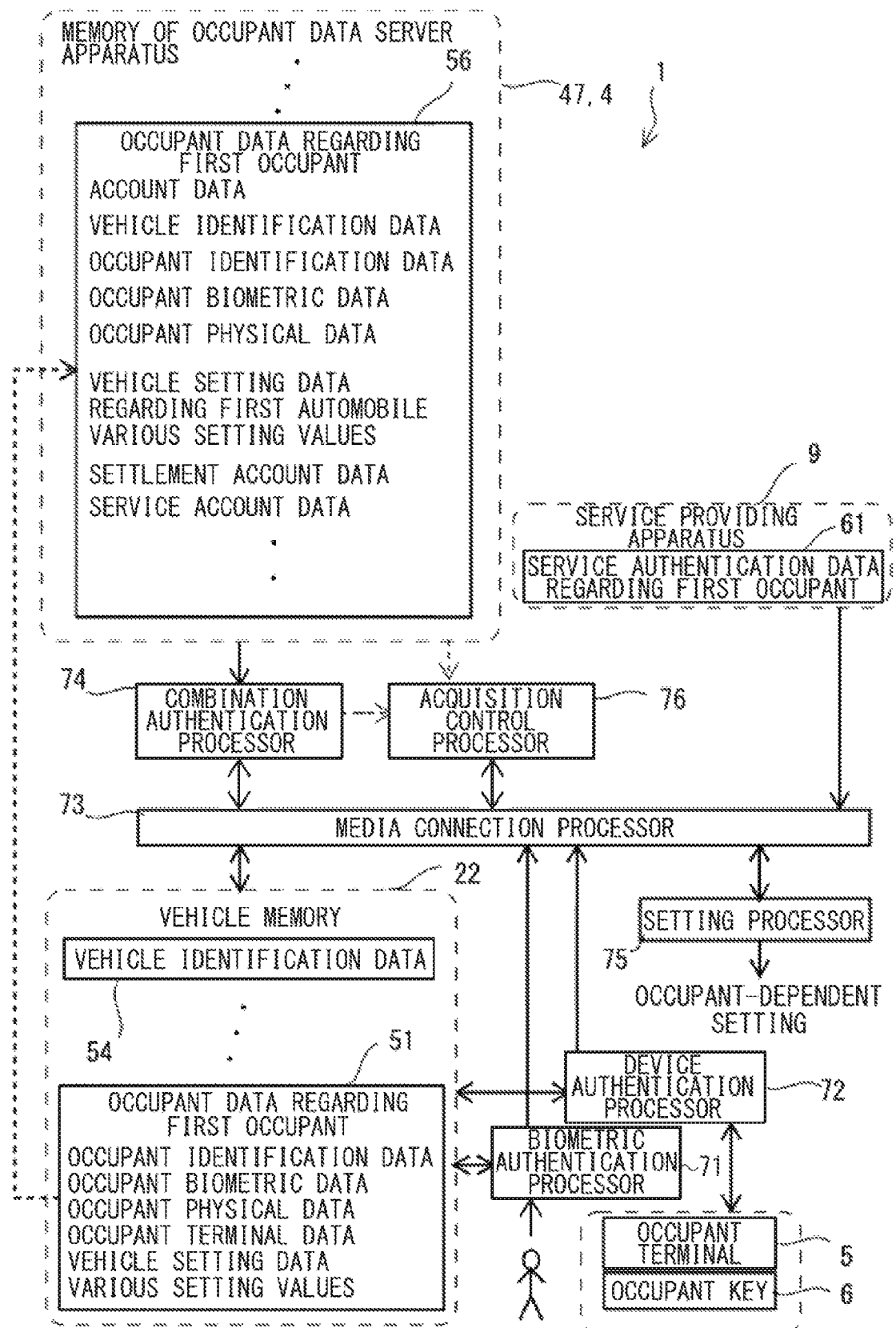
FIG. 4 is a block diagram illustrating where to record personalized setting values in the vehicle setting system in FIG. 1, and a plurality of processors in the vehicle setting system.

FIG. 4 is a block diagram illustrating where to record the personalized setting values in the vehicle setting system 1 in FIG. 1, and a plurality of processors in the vehicle setting system 1.

FIG. 4 illustrates where to record the personalized setting values for the plurality of the occupants who uses the automobile 2, and various processors to provide the automobile 2 with the setting of such data in accordance with the occupant on board.

In FIG. 4, in the vehicle memory 22 of the automobile 2, the personalized occupant data regarding the plurality of the occupants who gets in and is registered in the automobile 2, and vehicle identification data may be held. The vehicle identification data is different for each automobile 2. In FIG. 4, occupant data 51 regarding a first occupant is held as the personalized occupant data in the vehicle memory 22.

The occupant data 51 regarding the first occupant in the vehicle memory 22 may include, without limitation, occupant identification data, occupant biometric data, occupant physical data, and data regarding the occupant terminal 5, together with vehicle setting data. The vehicle setting data may include, without limitation, a plurality of setting values set in the first automobile 100 by the first occupant on their own. The occupant identification data, the occupant biometric data, the occupant physical data, and the data regarding the occupant terminal 5 are provided for identification of the first occupant.

The occupant identification data may include, without limitation, data allocated by the occupant monitoring device 31 to distinguish the first occupant from other occupants on the occasion of the registration and the recording of the first occupant in the first automobile 100.

The occupant biometric data may include, without limitation, a captured image of the first occupant taken by the in-vehicle camera 30 on the occasion of the registration of the first occupant in the first automobile 100, or a feature of appearance of the face and a vein pattern of the first occupant included in the captured image of the first occupant.

The occupant physical data may include, without limitation, data regarding a physical constitution of the first occupant, e.g., a height and a seated height, registered in the first automobile 100. The occupant physical data may include data estimated on the basis of the seat position on which the first occupant is seated and an imaging position in the captured image of the in-vehicle camera 30.

The data regarding the occupant terminal 5 may include, without limitation, identification data regarding the occupant terminal 5 used by the first occupant. The data regarding the occupant terminal 5 may include, without limitation, identification data for communication of the occupant terminal 5, a machine number, and identification data regarding an application installed in the occupant terminal 5.

The personalized occupant data held in the vehicle memory 22 for other occupants may also include similar data. However, it is desirable to keep from recording, in the vehicle memory 22, data that requires high safety such as settlement account data. As described later, such data may be held in the occupant data server apparatus 4.

As described, in the vehicle memory 22 of the automobile 2, the vehicle setting data including the setting values may be recorded for each occupant to be on board the automobile 2. This makes it possible for the automobile 2 to make a setting control of providing the automobile 2 with the occupant-dependent setting in accordance with the occupant on board, even under a situation in which communication with the outside is unavailable. Note that the automobile 2 is also referred to as an own vehicle.

In the memory 47 of the occupant data server apparatus 4, the personalized occupant data regarding the plurality of the occupants who logs in directly the occupant data server apparatus 4 and registers the account data may be held. In FIG. 4, occupant data 56 regarding the first occupant who uses the first automobile 100 may be held as the personalized occupant data in the memory 47 of the occupant data server apparatus 4.

The occupant data 56 regarding the first occupant in the memory 47 of the occupant data server apparatus 4 may include, without limitation, the account data at the plurality of the services available in the first automobile 100 to the first occupant, the account data to be used for the identification of the first occupant, the occupant identification data, the occupant biometric data, and the occupant physical data, together with the vehicle setting data. The vehicle setting data may include, without limitation, the plurality of the setting values set by the first occupant on their own in the first automobile 100 the first occupant uses.

The vehicle setting data in the occupant data server apparatus 4 may correspond to the vehicle setting data in the vehicle memory 22 of the first automobile 100.

The account data at the plurality of the services may include, without limitation, account data regarding the first occupant at the settlement service, and/or account data regarding the first occupant at the service providing apparatus 9. For example, the service providing apparatus 9 may receive the account data regarding the first occupant at the occupant data server apparatus 4 from the first automobile 100, and thereupon, the service providing apparatus 9 may compare the received account data with service authentication data regarding the first occupant held by itself. In a case where they coincide, the service providing apparatus 9 may permit access from the first automobile 100, transmit service information to the first automobile 100, and provide the first automobile 100 with the service information.

The occupant identification data, the occupant biometric data, and the occupant physical data may correspond to similar data in the vehicle memory 22 of the first automobile 100.

The personalized occupant data regarding other occupants held in the memory 47 of the occupant data server apparatus 4 may also include similar data.

Within the personalized occupant data, at least the vehicle setting data, the occupant identification data, and the occupant biometric data may coincide with what is held in the vehicle memory 22 of the automobile 2, on the assumption that they result from acquisition of what is held in the vehicle memory 22 of the automobile 2. Moreover, the occupant data server apparatus 4 may acquire the occupant physical data and the account data at the services from the automobile 2 and record them in the memory 47.

As described, the occupant data server apparatus 4 is configured to acquire, from the automobile 2, the setting values in the automobile 2 for the occupant in question, for each registered occupant. The occupant data server apparatus 4 is configured to record the acquired setting values in the memory 47 in associable relation to the occupant physical data regarding each occupant. In one embodiment of the technology, the memory 47 may serve as a "server memory". The setting value regarding the occupant in question to be acquired from the automobile 2 may include, without limitation, the setting values set in the automobile 2 by the occupant themselves on the occasion that the occupant in question gets in the automobile 2.

As illustrated in FIG. 4, the vehicle setting system 1 may mainly include, without limitation, a biometric authentication processor 71, a device authentication processor 72, a media connection processor 73, a combination authentication processor 74, an acquisition control processor 76, and a setting processor 75. These processors may be realized by the apparatuses executing programs. In this embodiment, among these processors, the biometric authentication processor 71, the device authentication processor 72, the media connection processor 73, and the setting processor 75 may be realized by the vehicle ECU 21 of the control system 3 of the automobile 2. The remainders, i.e., the combination authentication processor 74 and the acquisition control processor 76, may be realized by the CPU 45 of the occupant data server apparatus 4. The processors in the vehicle setting system 1 may be assigned as appropriate to the vehicle ECU 21 of the control system 3 of the automobile 2 and to the CPU 45 of the occupant data server apparatus 4 in accordance with, for example, system specifications and design concepts.

The biometric authentication processor 71 may biometric-authenticate the occupant on board the automobile 2. The biometric authentication processor 71 may acquire, for example, the captured image of the occupant on board the automobile 2 with the use of, for example, the in-vehicle camera 30 of the automobile 2. The biometric authentication processor 71 may extract physical features about, for example, the head of the occupant included in the acquired data, and compare the features with the occupant biometric data regarding the plurality of the occupants registered in advance in the vehicle memory 22. The occupant biometric data registered in the vehicle memory 22 may include, without limitation, the captured image of the face of the occupant on the occasion of the registration of the occupant in the automobile 2. The captured image may include, without limitation, data such as facial features and a vein pattern of the head. In a case with presence of the occupant biometric data that coincides with the captured image of the occupant on board the automobile 2 at a certain degree of coincidence or higher, the biometric authentication processor 71 may authenticate the occupant whose occupant biometric data is included in the personalized occupant data, as the occupant on board the automobile 2. In a case where the occupant biometric data regarding the plurality of the occupants held in the vehicle memory 22 includes the vein pattern of the head of each occupant or the vein pattern of a portion of the head of each occupant, it is possible for the biometric authentication processor 71 to authenticate accurately the occupant on board the automobile 2, without being affected by changes in the direction of the head of the occupant. The biometric authentication processor 71 may output a biometric authentication result of the occupant on board the automobile 2 to the media connection processor 73.

As described, the biometric authentication processor 71 may authenticate the occupant on board the automobile 2 as an authentication processor configured to authenticate only occupants.

The device authentication processor 72 may authenticate a device carried by the occupant on board the automobile 2. The device authentication processor 72 may acquire, for example, the identification data regarding the occupant terminal 5 to which the short-range communication equipment 26 is coupled by wireless communication, with the use of, for example, the short-range communication equipment 26 or the key proximity sensor 27 of the automobile 2. The device authentication processor 72 may compare the identification data with the data regarding the occupant terminals 5 regarding the plurality of the occupants held in the vehicle memory 22. In a case where the identification data regarding the occupant terminal 5 coincides with the data regarding the occupant terminal 5, the device authentication processor 72 may authenticate the occupant whose data regarding the occupant terminal 5 is included in the personalized occupant data, as the occupant on board the automobile 2. At this occasion, the device authentication processor 72 may determine whether or not the occupant terminal 5 is present in the vehicle on the basis of data such as a communication response speed between the short-range communication equipment 26 and the occupant terminal 5. The device authentication processor 72 may make the authentication as the occupant on board the automobile 2, only with respect to the occupant terminal 5 present in the vehicle. The device authentication processor 72 may output a device authentication result of the occupant terminal 5 carried by the occupant on board the automobile 2, to the media connection processor 73.

The media connection processor 73 may couple the automobile 2 to various server apparatuses coupled to the communication network 8, with the use of the mobile communication equipment 25, to carry out communication with the server apparatuses. The media connection processor 73 may couple the automobile 2 to, for example, the occupant data server apparatus 4 with the use of, for example, the mobile communication equipment 25, to carry out data communication with the occupant data server apparatus 4. The media connection processor 73 may attempt connection to the occupant data server apparatus 4 in a case where the biometric authentication result indicating the authentication is obtained from the biometric authentication processor 71.

The media connection processor 73 may acquire, from, for example, the vehicle memory 22 of the automobile 2, the data to be involved in authentication of connection to the CPU 45 of the occupant data server apparatus 4 for the occupant on board. The media connection processor 73 may transmit the acquired data to the combination authentication processor 74 of the occupant data server apparatus 4.

The combination authentication processor 74 may authenticate a combination of the occupant on board the automobile 2 and the automobile 2. For example, the combination authentication processor 74 may compare the data transmitted from the media connection processor 73 of the automobile 2 for the authentication of the connection, with the data held in the memory 47 of the occupant data server apparatus 4 for the authentication of the connection of the plurality of the occupants. The data transmitted from the automobile 2 for the authentication of the connection may include, without limitation, the captured image of the occupant on board the automobile 2 or the biometric data regarding the occupant based on the captured image, and the vehicle identification data 54 regarding the automobile 2. In a case where all the transmitted data coincides with the data held in the memory 47 of the occupant data server apparatus 4, the combination authentication processor 74 may give an approval of the connection. Otherwise, the combination authentication processor 74 does not have to give the approval of the connection. Upon giving the approval of the connection, the combination authentication processor 74 may notify the acquisition control processor 76, and the media connection processor 73 or the setting processor 75 of the automobile 2 of the approval of the connection.

It is generally considered to be sufficient that the data to be transmitted by the media connection processor 73 to the occupant data server apparatus 4 for the authentication of the connection includes the occupant identification data regarding the biometric-authenticated or device-authenticated occupant, and a password. However, in this embodiment, the data to be involved in the authentication of the connection may further include, without limitation, the vehicle identification data 54 regarding the automobile 2 to which the approval is given. This makes it possible for the combination authentication processor 74 of the occupant data server apparatus 4 to not only authenticate that the connection is being established for the registered regular occupant, but also authenticate that the regular occupant is attempting the connection from the regular automobile 2. With the combination authentication processor 74, it is possible for the occupant data server apparatus 4 to authenticate the combination of the regular occupant and the regular automobile 2. Moreover, with the vehicle identification data 54, it is possible for the occupant data server apparatus 4 to authenticate that the connection is established from the legitimate, regular automobile 2. Even in a case where the regular occupant attempts to get the authentication of the connection by an unregistered route from the automobile 2 having the vehicle identification data which is not registered in their personalized occupant data held in the memory 47 of the occupant data server apparatus 4, the occupant data server apparatus 4 may keep from authenticating the connection, as with the case with other occupants. The personalized occupant data registered in the memory 47 of the occupant data server apparatus 4 is kept from being inadvertently transmitted and leaked to the automobile 2 even in a case of regular processing. It is possible to permit the use of the personalized occupant data only within a limited range of the automobile 2 registered together with the occupant. In the personalized occupant data regarding the respective occupants, the vehicle identification data regarding a plurality of the automobiles 2 used by each occupant may be registered.

Thus, the combination authentication processor 74 is configured to authenticate the combination of the occupant authenticated by the authentication processor configured to authenticate only occupants and the automobile 2 for which the occupant is authenticated.

The acquisition control processor 76 may make an acquisition control of allowing the media connection processor 73 or the setting processor 75 of the automobile 2 to acquire the data held in the memory 47 of the occupant data server apparatus 4. In the memory 47 of the occupant data server apparatus 4, for example, the personalized vehicle setting data and the account data at the plurality of the services may be held. The personalized vehicle setting data may be used to provide the automobile 2 with the setting.

For example, in a case where the combination of the occupant and the automobile 2 is unauthenticated by the combination authentication processor 74, the acquisition control processor 76 may basically refrain from permitting the connection or the data acquisition by the media connection processor 73 of the automobile 2.

In a case where the combination of the occupant and the automobile 2 is authenticated by the combination authentication processor 74, the acquisition control processor 76 may permit the connection and the acquisition of the personalized occupant data by the media connection processor 73 of the automobile 2.

The setting processor 75 may provide the automobile 2 with the occupant-dependent setting in accordance with the occupant on board. For example, as illustrated in FIG. 2, the setting in the automobile 2 may include the travel setting for each occupant, e.g., the seat position, and setting for the network services available in the automobile 2 to the occupant. Upon acquiring the approval of the connection by the authentication of the combination from the combination authentication processor 74, the setting processor 75 may receive and acquire the personalized vehicle setting data and the account data at the services regarding the occupant related to the approval of the connection, from the personalized occupant data held in the memory 47 of the occupant data server apparatus 4.

Upon acquiring the approval of the connection from the combination authentication processor 74, or upon the authentication of the occupant by the device authentication processor 72 or the biometric authentication processor 71, the setting processor 75 may acquire the vehicle setting data regarding the occupant related to the approval from the personalized occupant data held in the vehicle memory 22 of the automobile 2.

On the basis of the setting values acquired, the setting processor 75 may provide each part of the automobile 2 with the setting, with the use of the vehicle setting device 34. For example, the setting processor 75 may provide the setting of, for example, the sheet position, the steering wheel position, the mirror position, the display setting, the operation setting, the navigation setting, and the travel setting. This makes it possible for the occupant on board the automobile 2 to obtain optimal environment for a drive. For example, it is possible to operate the steering wheel, while being seated on the seat, for example, at an optimal position.

Moreover, in a case where the account data at the network service is acquired, the setting processor 75 may allow the media connection processor 73 to establish the connection to the service providing apparatus 9 that provides the network service. The media connection processor 73 may transmit the account data from the mobile communication equipment 25 to the service providing apparatus 9 on the basis of an instruction by the setting processor 75 to establish the connection. The service providing apparatus 9 may compare the received account data with the service authentication data. In a case where they coincide, the service providing apparatus 9 may approve the connection. The connection of the media connection processor 73 to the service providing apparatus 9 makes it possible for the control system 3 of the automobile 2 to transmit and receive data to and from the service providing apparatus 9 that provides the network service, through the mobile communication equipment 25.

With such setting, the setting processor 75 is configured to provide the automobile 2 with the setting in accordance with at least the occupant authenticated in the automobile 2, and provide the setting of the connection to the network service to be used in the automobile 2 by the authenticated occupant. The setting processor 75 may automatically provide the setting on the basis of the authentication of the occupant on board the automobile 2. This saves the occupant from making the setting operation on their own after they get in. It is possible for the occupant to obtain optimal environment for a drive and start travel immediately.

Figure 5:
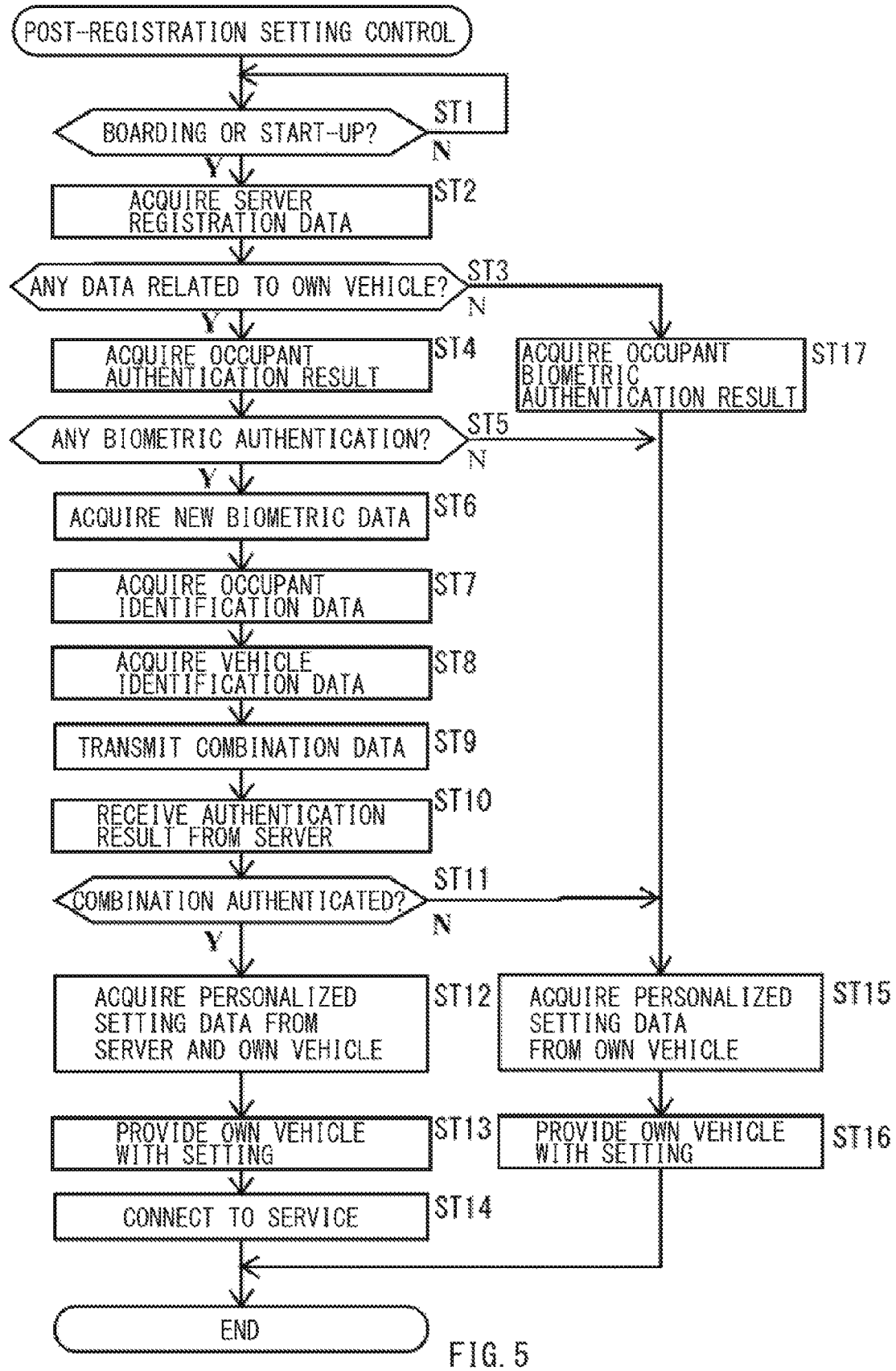
FIG. 5 is a flowchart of a setting control after registration of an occupant in the automobile, by the control system of the automobile in FIG. 1.

FIG. 5 is a flowchart of a setting control after the registration of the occupant in the automobile 2, by the control system 3 of the automobile 2 in FIG. 1.

The vehicle ECU 21 of the control system 3 of the automobile 2 may repetitively carry out the post-registration setting control in FIG. 5.

With the setting control in FIG. 5, the vehicle ECU 21 may provide the setting registered for the occupant, in accordance with the occupant on board the own vehicle. This makes it possible for the occupant to get in the automobile 2 on the basis of the previous setting, without making the setting operation on their own.

In step ST1, the vehicle ECU 21 may determine whether or not a new occupant gets in the automobile 2 as the own vehicle, or whether or not the automobile 2 makes a start-up with the occupant on board. The vehicle ECU 21 may determine whether or not the new occupant gets in the automobile 2 on the basis of, for example, detection of the opening or closing by the door opening and closing sensor 28, new detection of the occupant terminal 5 by the short-range communication equipment 26, and/or new detection of the occupant key 6 by the key proximity sensor 27. The vehicle ECU 21 may repeat this process until a new occupant gets in the automobile 2. In a case where a new occupant gets in the automobile 2, the vehicle ECU 21 may cause the flow to proceed to step ST2.

In step ST2, the vehicle ECU 21 may inquire of the occupant data server apparatus 4 a registration state with the use of the mobile communication equipment 25, and acquire presence or absence of server registration data regarding the own vehicle from the occupant data server apparatus 4.

In step ST3, the vehicle ECU 21 may determine whether or not data related to the own vehicle is registered in the server registration data acquired from the occupant data server apparatus 4. In a case where the data related to the own vehicle is registered in the occupant data server apparatus 4, the vehicle ECU 21 may cause the flow to proceed to step ST4. In a case where the data related to the own vehicle is not registered in the occupant data server apparatus 4, the vehicle ECU 21 may cause the flow to proceed to step ST17.

In step ST4, the vehicle ECU 21 may acquire the occupant authentication result of the occupant on board the automobile 2.

The biometric authentication processor 71 may compare physical features of the occupant on board the automobile 2 obtained from the captured image with the occupant biometric data registered in the personalized occupant data regarding the plurality of the occupants in the vehicle memory 22. The biometric authentication processor 71 may determine whether or not the occupant on board the automobile 2 is registered in the vehicle memory 22. In a case where the occupant on board the automobile 2 is registered in the vehicle memory 22, the biometric authentication processor 71 may authenticate the occupant as registered.

The device authentication processor 72 may compare the identification data regarding the occupant terminal 5 or the identification data regarding the occupant key 6 of the occupant on board the automobile 2 with the data regarding of the occupant terminal 5 registered in the personalized occupant data regarding the plurality of the occupants in the vehicle memory 22. The device authentication processor 72 may determine whether or not the occupant on board the automobile 2 is registered in the vehicle memory 22. In a case where the occupant on board the automobile 2 is registered in the vehicle memory 22, the device authentication processor 72 may authenticate the occupant as registered.

The vehicle ECU 21 may acquire, from the biometric authentication processor 71 and the device authentication processor 72, the occupant authentication result of the occupant on board the automobile 2.

In step ST5, the vehicle ECU 21 may determine whether or not the acquired occupant authentication result includes the biometric authentication result. In a case where the biometric authentication processor 71 authenticates the occupant related to the authentication as registered, the vehicle ECU 21 may determine that the acquired occupant authentication result includes the biometric authentication result regardless of the authentication result of the device authentication processor 72, and cause the flow to proceed to step ST6. In a case where the biometric authentication processor 71 does not authenticate the occupant related to the authentication as registered, the vehicle ECU 21 may determine that the acquired occupant authentication result does not include the biometric authentication result, and cause the flow to proceed to step ST15.

In step ST6, the vehicle ECU 21 may acquire new biometric data regarding the biometric-authenticated occupant from the occupant monitoring device 31 or the in-vehicle camera 30. In one embodiment of the technology, the occupant monitoring device 31 may serve as a "biometric data acquisition processor" configured to acquire biometric data regarding the occupant on board. In one example, the biometric data to be acquired by the vehicle ECU 21 in step ST6 may be different from the biometric data on the occasion of the biometric authentication result acquired in step ST4. The biometric data in step ST6 may include, for example, the captured image taken by the in-vehicle camera 30 at timing later than the biometric data in step ST4, or biometric data to be generated by the occupant monitoring device 31 with respect to the captured image at the later timing. The two-sage authentication based on the different pieces of the biometric data makes it possible to enhance reliability of the biometric authentication without sufficiently improving accuracy of the biometric authentication at each stage.

In step ST7, the vehicle ECU 21 may acquire the occupant identification data regarding the biometric-authenticated occupant from the personalized occupant data in the vehicle memory 22.

In step ST8, the vehicle ECU 21 may acquire the vehicle identification data regarding the own vehicle from the vehicle memory 22.

In step ST9, the vehicle ECU 21 may transmit combination data of the occupant and the automobile 2 acquired in steps ST7 to ST8 to the occupant data server apparatus 4 through the base station 7 and the communication network 8 with the use of the mobile communication equipment 25. The occupant data server apparatus 4 may allow the combination authentication processor 74 to compare the received combination data with the combination in the personalized occupant data regarding the plurality of the occupants registered in the memory 47 of the occupant data server apparatus 4. In a case where the received combination data is registered in the memory 47 of the occupant data server apparatus 4, the combination authentication processor 74 of the occupant data server apparatus 4 may authenticate the combination and transmit the authentication result of the combination to the automobile 2 through the communication device 41, the base station 7, and the communication network 8.

In step ST10, the vehicle ECU 21 may receive and acquire, from the occupant data server apparatus 4, with the mobile communication equipment 25, the authentication result by the combination authentication processor 74 with respect to the combination data of the occupant and the automobile 2.

In step ST11, the vehicle ECU 21 may determine whether or not the combination included in the combination data of the occupant and the automobile 2 is authenticated by the combination authenticating processor 74 in the occupant data server apparatus 4. In a case where the combination is authenticated in the occupant data server apparatus 4, the vehicle ECU 21 may cause the flow to proceed to step ST12. In a case where the combination is unauthenticated in the occupant data server apparatus 4, the vehicle ECU 21 may cause the flow to proceed to step ST15.

In step ST12, because the combination is authenticated by the combination authentication processor 74, the vehicle ECU 21 may acquire the personalized setting value for the authenticated occupant from the personalized occupant data regarding the plurality of the occupants in the memory 47 of the occupant data server apparatus 4 and the personalized occupant data regarding the plurality of the occupants in the vehicle memory 22 of the own vehicle. The vehicle ECU 21 may request, with the use of the mobile communication equipment 25, the occupant data server apparatus 4 to transmit the setting value. The vehicle ECU 21 may receive and acquire the personalized setting value for the combination-authenticated occupant from the occupant data server apparatus 4. The vehicle ECU 21 may read and acquire the personalized setting value for the authenticated occupant from the vehicle memory 22.

The vehicle ECU 21 may acquire the personalized setting value for the combination-authenticated occupant mainly from, for example, the memory 47 of the occupant data server apparatus 4. In a case with absence of the vehicle setting data included in the setting value acquired from the memory 47 of the occupant data server apparatus 4, the vehicle ECU 21 may acquire the personalized setting value from the personalized occupant data regarding the plurality of the occupants in the vehicle memory 22 of the own vehicle. In this case, the vehicle ECU 21 may acquire the personalized setting value for the combination-authenticated occupant from at least the memory 47 of the occupant data server apparatus 4, out of the memory 47 of the occupant data server apparatus 4 and the vehicle memory 22 of the automobile 2.

In step ST13, the vehicle ECU 21 may provide the own vehicle with the setting, with the use of the vehicle setting device 34, on the basis of the vehicle setting data included in the personalized setting data acquired. Thus, the setting of, for example, the seat position for the occupant related to the authentication may be provided, corresponding to the vehicle setting data.

In step ST14, the vehicle ECU 21 may couple the own vehicle to the network service, with the mobile communication equipment 25, with the use of the account data at the network service included in the personalized setting value acquired. Thus, the vehicle ECU 21 may be coupled to the service providing apparatus 9 that provides the network service, through the mobile communication equipment 25, and become ready to receive the service information from the service providing apparatus 9. Thereafter, the vehicle ECU 21 may end the control.

Step ST15 may be carried out, for example, in a case where, in step ST5, the biometric authentication processor 71 of the own vehicle does not authenticate the occupant, or in a case where, in step ST11, the combination authentication processor 74 does not authenticate the combination of the occupant and the automobile 2. The vehicle ECU 21 may stop data acquisition from the occupant data server apparatus 4, and acquire the personalized setting value for the authenticated occupant only from the vehicle memory 22 of the own vehicle. The authentication in this case may be made solely by either the biometric authentication processor 71 or the device authentication processor 72. In a case where the authentication is made by the biometric authentication processor 71, the device authentication processor 72, or both, the vehicle ECU 21 may acquire the personalized setting value for the occupant related to the authentication from the own vehicle.

In step ST16, the vehicle ECU 21 may provide the own vehicle with the setting on the basis of the vehicle setting data included in the personalized setting value acquired from the vehicle memory 22. Thus, the setting of, for example, the seat position for the occupant related to the authentication may be provided, corresponding to the vehicle setting data registered for the relevant occupant in the vehicle memory 22. Thereafter, the vehicle ECU 21 may end the control.

Step ST17 may be carried out in a case where, in step ST3, the data related to the own vehicle is not registered in the occupant data server apparatus 4. The vehicle ECU 21 may acquire the occupant authentication result of the occupant on board the own vehicle.

In this case, because the data related to the own vehicle is not registered in the occupant data server apparatus 4, unlike step ST4, the vehicle ECU 21 may acquire only the biometric authentication result by the biometric authentication processor 71, out of the authentication result by the biometric authentication processor 71 and the authentication result by the device authentication processor 72.

Thereafter, the vehicle ECU 21 may cause the flow to proceed to step ST15. The vehicle ECU 21 may acquire the personalized setting value for the biometric-authenticated occupant from the vehicle memory 22 of the own vehicle, and provide the own vehicle with the setting on the basis of the acquired vehicle setting data. Thereafter, the vehicle ECU 21 may end the control.

As described, in the setting control in FIG. 5, in the case where the occupant is biometric-authenticated by the biometric authentication processor 71, the vehicle ECU 21 may transmit the combination data of the occupant and the automobile 2 to the occupant data server apparatus 4. The combination authentication processor 74 of the occupant data server apparatus 4 may authenticate the combination of the occupant and the automobile 2 by the combination of the occupant identification data regarding the occupant biometric-authenticated by the biometric authentication processor 71 and the vehicle identification data regarding the authenticated automobile 2. In the case where the occupant of the automobile 2 is biometric-unauthenticated by the biometric authentication processor 71, the combination authentication processor 74 may refrain from making the authentication because the combination authentication processor 74 does not obtain the combination data of the occupant and the automobile 2.

It is to be noted that the two-stage authentication of the occupant on board the automobile 2 may be carried out without the forgoing processes of steps ST1 to ST3.

In one alternative, instead of the processes of steps ST1 to ST3, the vehicle ECU 21 may determine, for example, presence or absence, in the vehicle memory 22, of connection data to the occupant data server apparatus 4. In a case with the presence of the connection data, the vehicle ECU 21 may cause the flow to proceed to step ST4. In a case with the absence of the connection data, the vehicle ECU 21 may cause the flow to proceed to step ST17.

Figure 6:
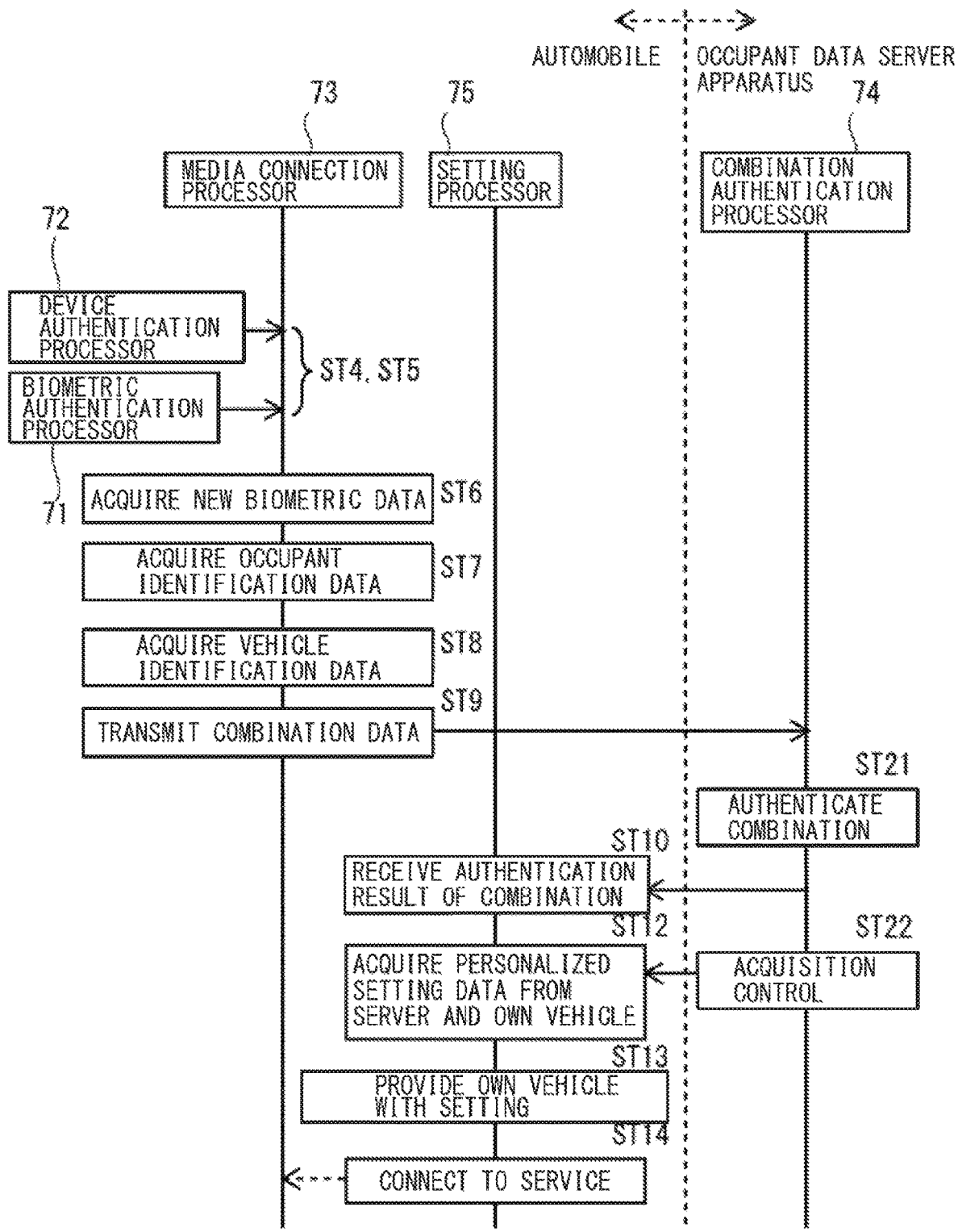
FIG. 6 is a timing chart of the setting control in a case of two-stage authentication of the occupant in the vehicle setting system in FIG. 1.

FIG. 6 is a timing chart of the setting control in the case with the two-stage authentication of the occupant in the vehicle setting system 1 in FIG. 1.

The timing chart of the setting control in FIG. 6 is an example case where the occupant on board the automobile 2 is biometrically authenticated, and furthermore, the combination of the occupant and the automobile 2 is authenticated.

FIG. 6 illustrates the combination authentication processor 74 that is realized on the CPU 45 of the occupant data server apparatus 4, together with the biometric authentication processor 71, the device authentication processor 72, the media connection processor 73, and the setting processor 75 that are realized on the vehicle ECU 21 of the automobile 2. In the figure, time flows from top to bottom.

In the following, description is given of a state in which the first occupant is on board the automobile 2. The description assumes that the vehicle ECU 21 of the automobile 2 carries out the setting processing in FIG. 5 mainly as the media connection processor 73.

In the memory 47 of the occupant data server apparatus 4, the setting value in the first automobile 100 for the first occupant in question related to the processing may be held in association with the occupant physical data regarding the first occupant. The setting value in the first automobile 100 for the first occupant may be acquired in advance from the first automobile 100.

In step ST4 in FIG. 5, the vehicle ECU 21 as the media connection processor 73 of the automobile 2 may acquire the occupant authentication result by the biometric authentication processor 71 and the occupant authentication result by the device authentication processor 72 for the first occupant on board the automobile 2. In step ST5, the vehicle ECU 21 as the media connection processor 73 of the automobile 2 may determine that the biometric authentication result is included. In this case, in steps ST6 to ST9, the vehicle ECU 21 as the media connection processor 73 may acquire the biometric data newly acquired regarding the first occupant on board the automobile 2, the occupant identification data, and the vehicle identification data from, for example, the occupant data 51 regarding the first occupant in the vehicle memory 22. The vehicle ECU 21 as the media connection processor 73 may transmit the data acquired to the occupant data server apparatus 4. The communication device 41 of the occupant data server apparatus 4 may receive the combination data, and thereupon, in step ST21, the CPU 45 of the occupant data server apparatus 4, as the combination authentication processor 74, may compare the received combination data with the personalized occupant data regarding the plurality of the occupants in the memory 47 of the occupant data server apparatus 4, and authenticate the combination. The combination authentication processor 74 may authenticate the combination on the basis of the biometric data acquired at different timing from the biometric data used in the authentication by the biometric authentication processor 71. Thereafter, the combination authentication processor 74 may transmit the authentication result of the combination indicating that the first occupant is the registered occupant, to the setting processor 75 of the automobile 2. The authentication result may be transmitted from the communication device 41 of the occupant data server apparatus 4 to the automobile 2 through the communication network 8 and the base station 7.

In the automobile 2, in step ST10, the vehicle ECU 21 as the setting processor 75 may receive the authentication result by the combination authentication processor 74 of the combination data of the occupant and the automobile 2, from the occupant data server apparatus 4, with the mobile communication equipment 25.

In steps ST12 to ST14, the vehicle ECU 21 of the automobile 2, as the media connection processor 73, may acquire the personalized setting value for the first occupant from the memory 47 of the occupant data server apparatus 4 and the vehicle memory 22 of the own vehicle. The vehicle ECU 21 of the automobile 2, may provide, from the setting processor 75, the own vehicle with the setting, and establish the connection to the network service.

At this occasion, for example, as for the personalized vehicle setting data, even in a case where the setting processor 75 acquires various setting from the occupant data server apparatus 4, the setting processor 75 may prioritize the setting held in the vehicle memory 22 of the own vehicle, and provide the own vehicle with the setting. Moreover, in a case where the setting processor 75 fails to acquire the setting from the vehicle memory 22, the setting processor 75 may acquire the vehicle setting data from the occupant data server apparatus 4 and provide the own vehicle with the setting.

Thus, in the case where the first occupant is biometrically authenticated by the biometric authentication processor 71 of the automobile 2, and the combination of the first occupant and the automobile 2 is authenticated by the combination authentication processor 74, the setting processor 75 may acquire the personalized setting value for the first occupant from the memory 47 of the occupant data server apparatus 4, and provide the own vehicle with the setting. In one embodiment of the technology, the memory 47 may serve as the "server memory". It is possible for the automobile 2 to be provided with the setting based on the setting value for the first occupant on board, and adjust automatically, for example, the seat position for the first occupant. This saves the first occupant from making an operation on their own to re-adjust, for example, the seat position for their convenience every time they get in the automobile 2.

The occupant of the automobile 2, e.g., the first occupant, does not constantly use the single automobile 2. Instead, for example, they sometimes stop using the old automobile 2 and begin the new automobile 2, or alternatively, they sometimes use more than one automobile 2 at the same time.

Even with the use of the vehicle setting system 1 described above, when the occupant gets in the new automobile 2, the occupant has to make the setting operation on their own on the automobile 2 the occupants newly gets in. The occupant has to make an operation to make initial adjustment of, for example, the seat position for their convenience in the new automobile 2.

Thus, there is room for further improvement in the vehicle setting system 1 described above.

Figure 7:
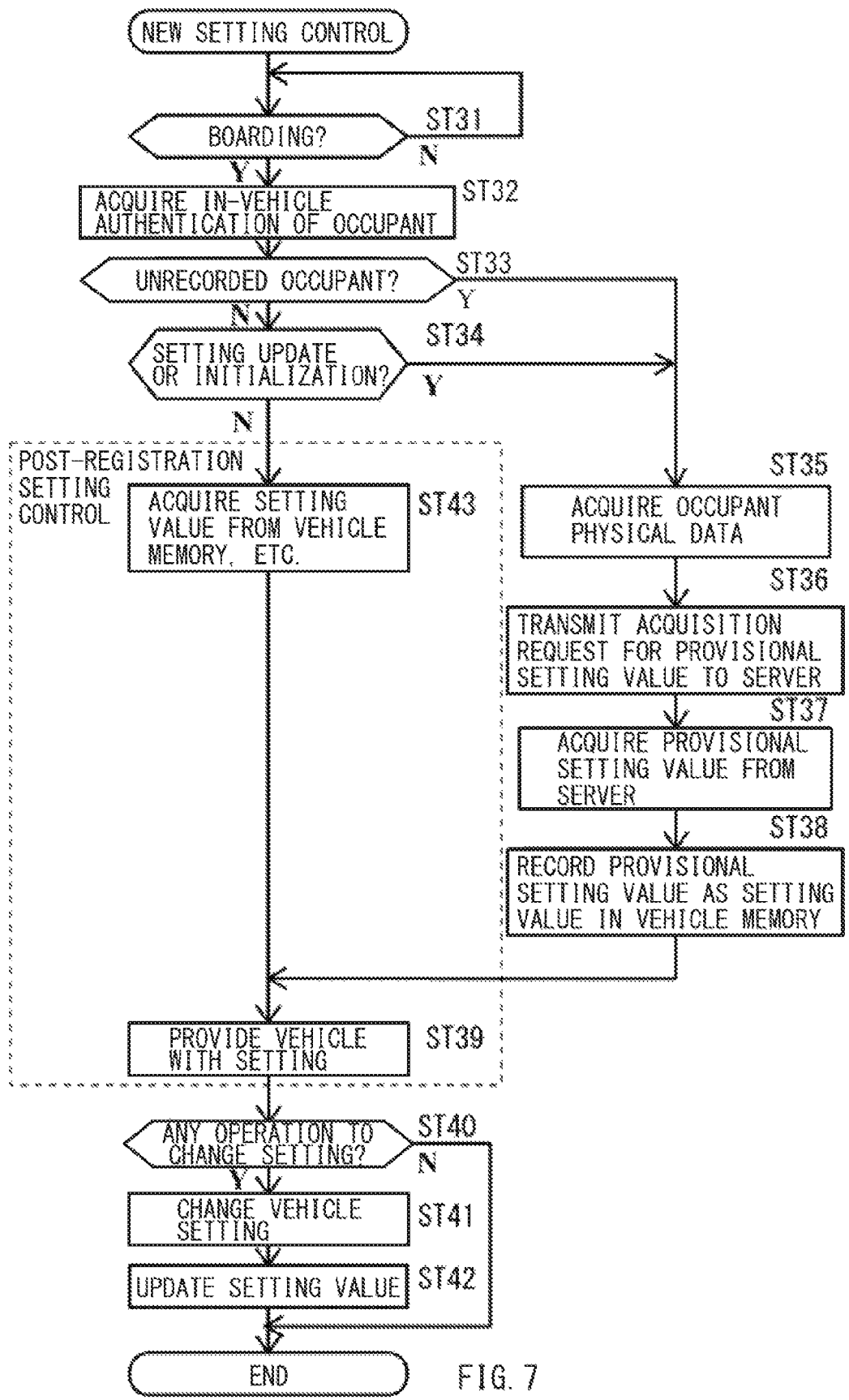
FIG. 7 is a flowchart of a new setting control of registering a new occupant in the automobile, by the control system of the automobile in FIG. 1.

FIG. 7 is a flowchart of a new setting control that makes it possible to register a new occupant in the automobile 2, by the control system 3 of the automobile 2 in FIG. 1.

The vehicle ECU 21 of the control system 3 of the automobile 2 may carry out repetitively the new setting control in FIG. 7, basically separately from the post-registration setting control in FIG. 5, to register a new occupant in the automobile 2.

In step ST31, the vehicle ECU 21 may determine whether or not a new occupant gets in the automobile 2 as the own vehicle. The vehicle ECU 21 may also determine whether or not the automobile 2 makes a start-up with the occupant on board. The vehicle ECU 21 may repeat this process until a new occupant gets in the automobile 2. In a case where a new occupant gets in the automobile 2, the vehicle ECU 21 may cause the flow to proceed to step ST32.

In step ST32, the vehicle ECU 21 may acquire an in-vehicle authentication result of the occupant newly on board.

The biometric authentication processor 71 may compare physical features of the occupant on board the automobile 2 obtained from the captured image with the occupant biometric data registered in the personalized occupant data regarding the plurality of the occupants in the vehicle memory 22. The biometric authentication processor 71 may determine whether or not the occupant on board the automobile 2 is registered in the vehicle memory 22. In a case where the occupant on board the automobile 2 is a new occupant unregistered in the vehicle memory 22, the biometric authentication processor 71 may refrain from authenticating the occupant as registered.

The device authentication processor 72 may compare the identification data regarding the occupant terminal 5 or the identification data regarding the occupant key 6 of the occupant on board the automobile 2 with the data regarding the occupant terminal 5 registered in the personalized occupant data regarding the plurality of the occupants in the vehicle memory 22. The device authentication processor 72 may determine whether or not the occupant on board the automobile 2 is registered in the vehicle memory 22. In a case where the occupant on board the automobile 2 is a new occupant unregistered in the vehicle memory 22, the device authentication processor 72 may refrain from authenticating the occupant as registered.

The vehicle ECU 21 may acquire the occupant authentication result of the occupant on board the automobile 2 from the biometric authentication processor 71 and the device authentication processor 72.

Thus, the vehicle ECU 21 may acquire the occupant authentication result of the occupant related to the processing. In one embodiment of the technology, the vehicle ECU 21 may serve as an "occupant data acquisition processor".

In step ST33, the vehicle ECU 21 may determine whether or not the occupant on board the automobile 2 is an unrecorded occupant in the vehicle memory 22. In a case where the occupant is not an unrecorded occupant in the vehicle memory 22, the vehicle ECU 21 may cause the flow to proceed to step ST34. In a case where the occupant is an unrecorded occupant in the vehicle memory 22, the vehicle ECU 21 may cause the flow to proceed to step ST35.

In step ST34, the vehicle ECU 21 may determine whether or not to update or initialize the vehicle setting data held in the vehicle memory 22 regarding the occupant on board the automobile 2. Sometimes, the occupant may operate the vehicle operation device 33 to actively update or initialize their vehicle setting data held in the vehicle memory 22. In such a case, the vehicle ECU 21 may determine to compulsively update or initialize the vehicle setting data, and cause the flow to proceed to step ST35. Otherwise, the vehicle ECU 21 may cause the flow to proceed to step ST43.

In step ST35, the vehicle ECU 21 may acquire physical data regarding the unregistered occupant on board the automobile 2.

For example, the vehicle ECU 21 may acquire the physical data regarding the unregistered occupant on board the automobile 2 on the basis of the captured image of the unregistered occupant included in the captured image of the in-vehicle camera 30 or the biometric data regarding the unregistered occupant in the occupant monitoring device 31. The occupant on board the automobile 2 is captured by the in-vehicle camera 30, while seated on the seat and facing forward. The vehicle ECU 21 is configured to estimate physical constitution data regarding a height and a seated height of the occupant, on the basis of, for example, the seat position and the eye level of the occupant in the captured image.

Moreover, the vehicle ECU 21 may display an input screen of the physical data on the vehicle display device 32, and acquire the physical constitution data regarding the height and the seated height inputted to the vehicle operation device 33 by the occupant themselves.

Thus, the vehicle ECU 21 is configured to acquire or estimate the physical data regarding the occupant on board the automobile 2 in a case with absence of the setting value for the occupant on board the automobile 2 held in the vehicle memory 22 of the automobile 2 or in a case where an initialization button of the setting or an update button of the setting is operated. In one embodiment of the technology, the vehicle ECU 21 may serve as the "occupant data acquisition processor".

In step ST36, the vehicle ECU 21 may transmit, to the occupant data server apparatus 4, an acquisition request for a provisional setting value for the occupant. The provisional setting value may be used as the setting value in the automobile 2. The acquisition request for the provisional setting value may be transmitted from the mobile communication equipment 25 of the automobile 2 to the occupant data server apparatus 4 through the base station 7 and the communication network 8. In the occupant data server apparatus 4, the communication device 41 may receive an acquisition request for data from each automobile 2, and thereupon, the requested data may be generated by processing by the CPU 45 as the acquisition control processor 76. The communication device 41 of the occupant data server apparatus 4 may transmit the data generated by the CPU 45 to the mobile communication equipment 25 of the automobile 2 as a request sender, through the communication network 8 and the base station 7.

The acquisition request for the provisional setting value may include the physical data regarding, for example, the physical constitution of the occupant. The CPU 45 of the occupant data server apparatus 4, as the acquisition control processor 76, may generate, for example, the provisional setting value for the seat position and the provisional setting value for the steering wheel position, on the basis of, for example, the physical constitution of the occupant acquired from the automobile 2.

In step ST37, the vehicle ECU 21 may acquire the provisional setting value related to the request. The provisional setting value may be received by the mobile communication equipment 25 from the occupant data server apparatus 4.

Thus, the vehicle ECU 21 is configured to acquire the provisional setting value generated in the occupant data server apparatus 4. In one embodiment of the technology, the vehicle ECU 21 may serve as a "provisional acquisition processor".

In step ST38, the vehicle ECU 21 may record the acquired provisional setting value as an initial setting value in the vehicle memory 22.

In step ST39, the vehicle ECU 21 may acquire the provisional setting value as the initial setting value held in the vehicle memory 22, and provide the own vehicle with the setting with the use of the vehicle setting device 34. Thus, the seat and the steering wheel of the automobile 2 are set to positions estimated on the basis of the physical data such as the physical constitution of the occupant. This saves the occupant from making an operation to set the seat position and the steering wheel position on their own. It is possible for the occupant to obtain the seat position and the steering wheel position estimated in accordance with their physical constitution.

In step ST40, the vehicle ECU 21 may determine presence or absence of an operation to change the setting by the occupant. In a case of fine adjustment of the estimated seat position and the estimated steering wheel position, the occupant may adjust the seat position and the steering wheel position with the use of, for example, the vehicle operation device 33. In a case with such adjustment, the vehicle ECU 21 may determine the presence of the operation to change the setting by the occupant, and cause the flow to proceed to step ST41. In a case with the absence of the operation to change the setting by the occupant, the vehicle ECU 21 may end the control. In this case, the setting value of the seat position and the setting value of the steering wheel position estimated by the CPU 45 as the acquisition control processor 76 of the occupant data server apparatus 4 may be held in the vehicle memory 22.

In step ST41, the vehicle ECU 21 may change the setting of, for example, the seat position and the steering wheel position of the own vehicle, in accordance with the operation by the occupant, with the use of the vehicle setting device 34.

In step ST42, the vehicle ECU 21 may update the setting values held in the vehicle memory 22 to the changed setting values. Thereafter, the vehicle ECU 21 may end the control. In this case, in the vehicle memory 22, the setting value after the fine adjustment of the seat position estimated by the CPU 45 of the occupant data server apparatus 4 and the setting value after the fine adjustment of the steering wheel position estimated by the CPU 45 of the occupant data server apparatus 4 may be recorded. The CPU 45 of the occupant data server apparatus 4 may serve as the acquisition control processor 76.

Thus, the vehicle ECU 21, as the setting processor 75, may record the provisional setting value acquired, as the setting value for the occupant related to the processing, in the vehicle memory 22 in the automobile 2 and provide the automobile 2 with the setting.

Step ST43 is a process to be carried out in a case without the update of the vehicle setting data held in the vehicle memory 22 in step ST34. The vehicle ECU 21 may acquire the setting value held for the occupant from the vehicle memory 22, and cause the flow to proceed to step ST39. Thereafter, the vehicle ECU 21 may provide the automobile 2 with the setting of the setting value acquired. In the case with the absence of the operation by the occupant, the vehicle ECU 21 may end the control immediately. It is to be noted that in a case where the new setting control in FIG. 7 is carried out separately from the post-registration setting control in FIG. 5, the vehicle ECU 21 may carry out the post-registration setting control in FIG. 5, in replacement of the processes of steps ST43 and ST39.

Figure 8:
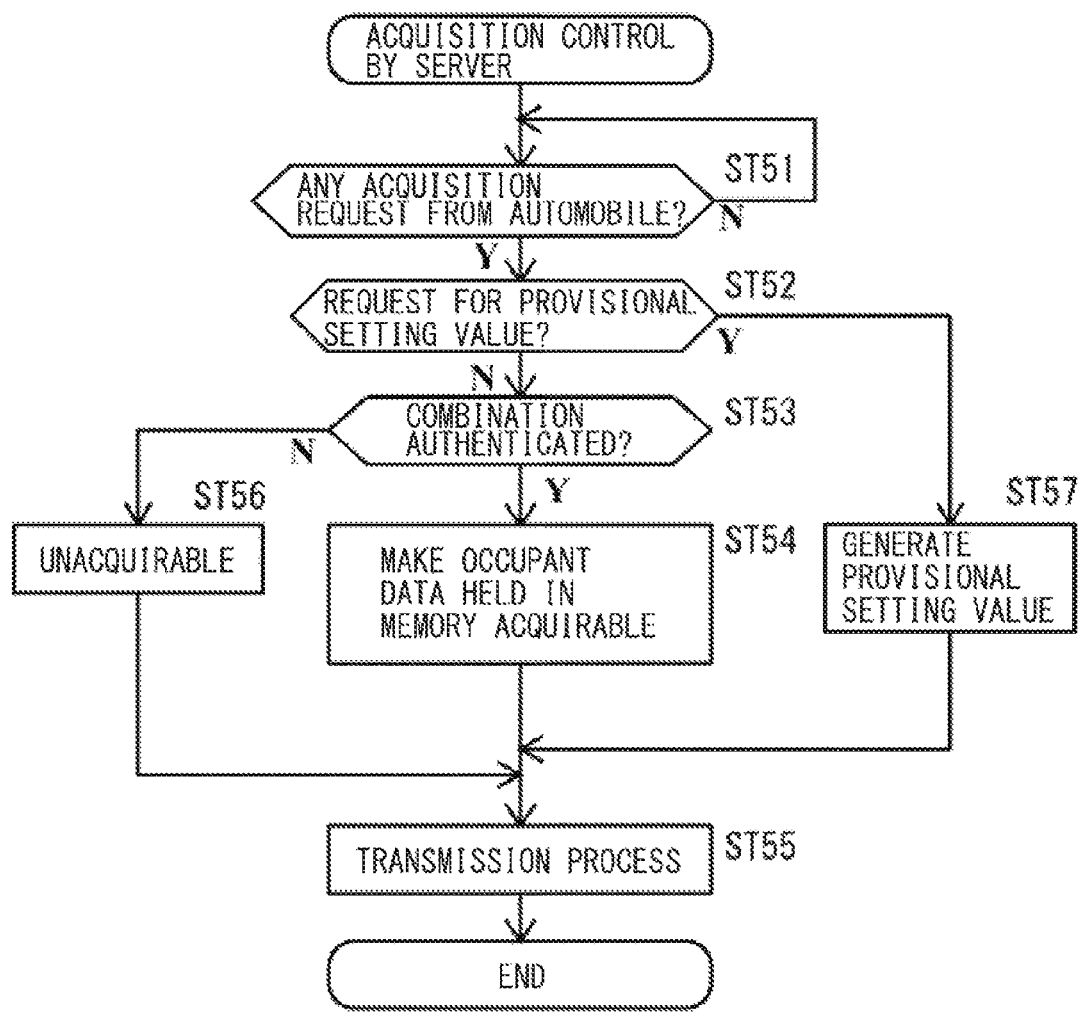
FIG. 8 is a flowchart of an acquisition control of answering an acquisition request from the automobile, by the occupant data server apparatus in FIG. 1.

FIG. 8 is a flowchart of an acquisition control of answering the acquisition request from the automobile 2, by the occupant data server apparatus 4 in FIG. 1.

The CPU 45 of the occupant data server apparatus 4, as the acquisition control processor 76, may carry out repetitively the acquisition control in FIG. 8.

In step ST51, the CPU 45 of the occupant data server apparatus 4 may determine whether or not the communication device 41 has received the acquisition request from the automobile 2. In a case where the acquisition request has not been received, the CPU 45 may repeat this process. In a case where the acquisition request has been received, the CPU 45 may cause the flow to proceed to step ST52.

In step ST52, the CPU 45 of the occupant data server apparatus 4 may determine whether or not the acquisition request is to acquire the provisional setting value. As described, non-limiting examples of the acquisition request from the automobile 2 includes those for personal occupant data regarding the combination-authenticated occupant, e.g., the vehicle setting data, and those for the provisional setting value regarding the unregistered occupant who is not combination-authenticated. In a case where the acquisition request is to acquire the provisional setting value, the CPU 45 may cause the flow to proceed to step ST57. In a case where the acquisition request is not to acquire the provisional setting value but to acquire the personalized occupant data regarding the combination-authenticated occupant, the CPU 45 may cause the flow to proceed to step ST53.

In step ST53, the CPU 45 of the occupant data server apparatus 4 may determine whether or not the occupant related to the acquisition request has already been combination-authenticated. The combination authentication processor 74 may output the authentication result of the combination of the occupant on board the automobile 2 and the automobile 2 to the acquisition control processor 76. The CPU 45 may check the authentication result of the combination acquired from the combination authentication processor 74 to determine whether or not the occupant related to the acquisition request has been already combination-authenticated. In a case where the occupant related to the acquisition request has been already combination-authenticated, the CPU 45 may cause the flow to proceed to step ST54. In a case where the occupant related to the acquisition request has not yet been combination-authenticated, the CPU 45 may cause the flow to proceed to step ST56.

In step ST54, the CPU 45 of the occupant data server apparatus 4 may make acquirable the personalized occupant data regarding the occupant related to the request held in the memory 47 of the occupant data server apparatus 4.

In step ST55, the CPU 45 of the occupant data server apparatus 4 may transmit the personalized occupant data regarding the occupant whose occupant data is made acquirable, to the automobile 2 as the request sender. Thereafter, the CPU 45 may end the control.

Thus, in the case where the combination of the occupant on board the automobile 2 and the automobile 2 is authenticated, the CPU 45 of the occupant data server apparatus 4, as the acquisition control processor 76, is configured to make the setting value for the occupant held in the memory 47 of the occupant data server apparatus 4 acquirable by the automobile 2.

In step ST56, the CPU 45 of the occupant data server apparatus 4 may make the personalized occupant data unacquirable because the occupant related to the request is combination-unauthenticated. Thereafter, the CPU 45 may transmit the unacquirablity in step ST55 to the automobile 2 as the request sender, and end the control.

Thus, in the case where the combination of the occupant on board the automobile 2 and the automobile 2 is unauthenticated, the CPU 45 of the occupant data server apparatus 4, as the acquisition control processor 76, is configured to refrain from making the setting value for the occupant held in the memory 47 of the occupant data server apparatus 4 acquirable by the automobile 2.

In step ST57, the CPU 45 of the occupant data server apparatus 4 may generate the provisional setting value for the occupant related to the request. For example, the CPU 45 may acquire the physical data regarding the occupant related to the processing of the automobile 2 and generate the provisional setting value for the occupant. In one embodiment of the technology, the CPU 45 may serve as a "provisional generation processor". Thereafter, the CPU 45 may transmit the provisional setting value generated in step ST55 to the automobile 2 as the request sender, and end the control. The CPU 45, as the acquisition control processor 76, is configured to make the provisional setting value acquirable by the automobile 2, at the acquisition request for the provisional setting value by the vehicle ECU 21 of the automobile 2, even in a case where only the authentication in the automobile 2 is obtained and the combination of the occupant on board the automobile 2 and the automobile 2 is unauthenticated. In the automobile 2 as the request sender, in step ST37 in FIG. 7, the vehicle ECU 21 in the automobile 2 may acquire the provisional setting value generated by the CPU 45 of the occupant data server apparatus 4. In one embodiment of the technology, the CPU 45 may serve as the "provisional generation processor". In one embodiment of the technology, the vehicle ECU 21 serve as the "provisional acquisition processor".

Figure 9:
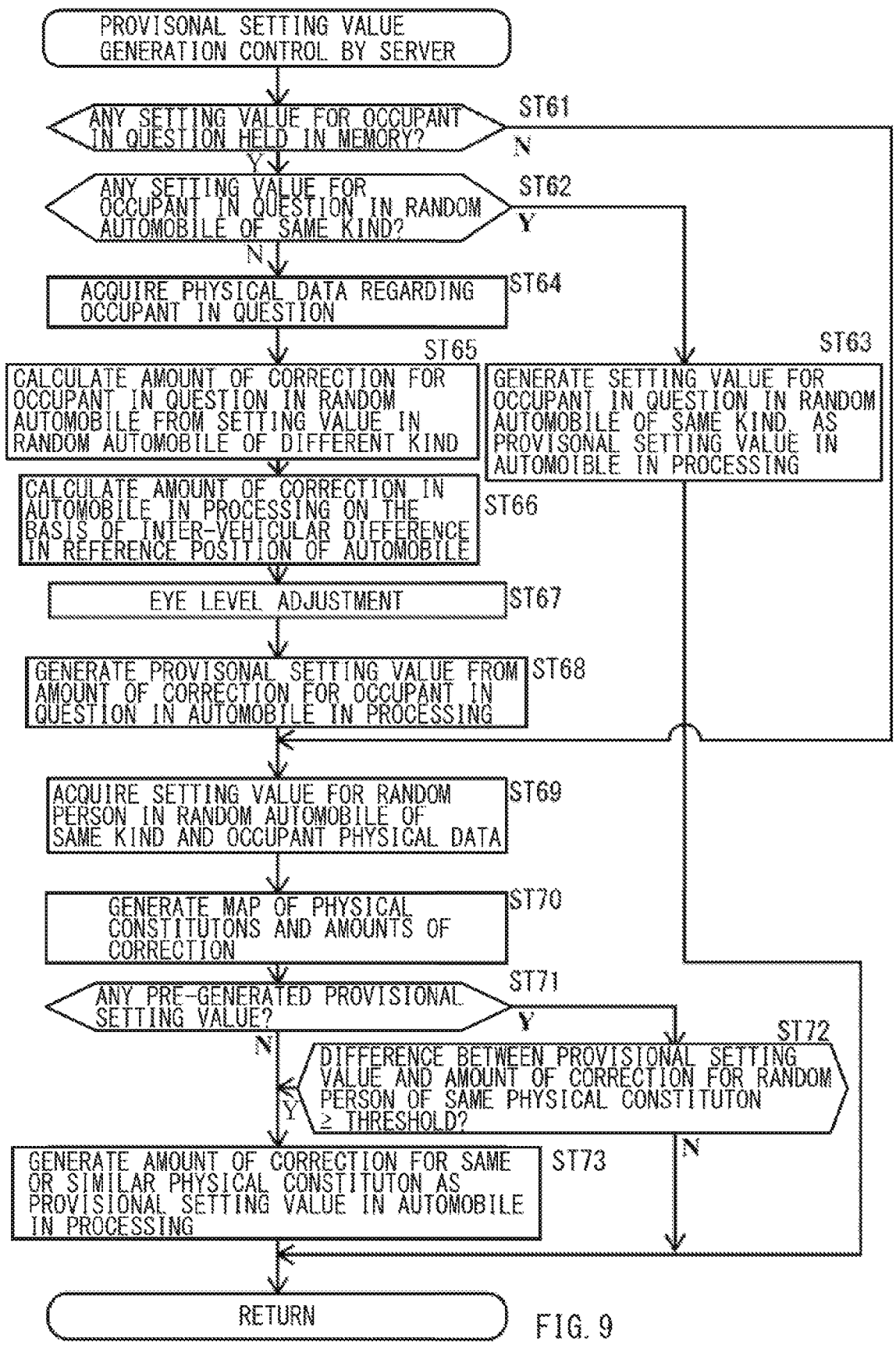
FIG. 9 is a flowchart of a generation control of a provisional setting value, by the occupant data server apparatus in FIG. 1.

FIG. 9 is a flowchart of a generation control of the provisional setting value by the occupant data server apparatus 4 in FIG. 1.

The CPU 45 of the occupant data server apparatus 4, as the "provisional generation processor" in step ST57 in FIG. 8, may carry out the generation control of the provisional setting value in FIG. 9.

The generation control of the provisional setting value in FIG. 9 is provided for generation of the provisional setting value in the automobile 2 related to the processing regarding the occupant in question related to a generation process of the provisional setting value, on the basis of relation between the physical data regarding the occupant in question related to the processing and setting values for a plurality of occupants in a plurality of the automobiles 2 held in the memory 47 of the occupant data server apparatus 4.

The generation control of the provisional setting value in FIG. 9 may be caried out in the case where the occupant is not registered in the vehicle memory 22 of the automobile 2. Accordingly, the personalized occupant data held in the memory 47 of the occupant data server apparatus 4 regarding the occupant in question related to the processing does not include the vehicle setting data regarding the automobile 2 with the occupant on board. The personalized occupant data held in the memory 47 of the occupant data server apparatus 4 regarding the occupant in question related to the processing may include solely the vehicle setting data regarding other automobiles.

In step ST61, the CPU 45 of the occupant data server apparatus 4 may determine presence or absence of the setting value in the automobile 2 for the occupant in question related to the processing held in the memory 47 of the occupant data server apparatus 4. In a case with the presence of the setting value for the occupant in question held in the memory 47, the CPU 45 may cause the flow to proceed to step ST62. In a case with the absence of the setting value for the occupant in question held in the memory 47, the CPU 45 may cause the flow to proceed to step ST69.

In step ST62, the CPU 45 of the occupant data server apparatus 4 may determine presence or absence of the setting value in a random vehicle of the same kind for the occupant in question held in the memory 47 of the occupant data server apparatus 4, on the basis of, for example, the occupant identification data regarding the occupant in question included in the acquisition request for the provisional setting value. In the memory 47 of the occupant data server apparatus 4 in FIG. 4, the occupant data 56 regarding the first occupant may include the vehicle setting data regarding the first occupant in the first automobile 100. In this case, for example, when the automobile 2 related to the processing included in the acquisition request for the provisional setting value is of the same vehicle kind, the same vehicle class, and the same size as the first automobile 100, the CPU 45 may determine the presence of the setting value in the random vehicle of the same kind for the occupant in question, and cause the flow to proceed to step ST63. In a case with absence of the personalized occupant data regarding the occupant in question in the memory 47 of the occupant data server apparatus 4, or in a case where the vehicle identification data held for the occupant in question is that of a different vehicle kind, a different vehicle class, and a different size from the automobile 2 related to the processing, the CPU 45 may determine the absence of the setting value in the random vehicle of the same kind for the occupant in question, and cause the flow to proceed to step ST64.

In step ST63, the CPU 45 of the occupant data server apparatus 4 may acquire the setting value for the occupant in question for the random vehicle of the same kind included in the personalized occupant data regarding the occupant in question, from the memory 47 of the occupant data server apparatus 4. Thus, the CPU 45 of the occupant data server apparatus 4 may generate the acquired setting value as the provisional setting value in the automobile 2 related to the processing.

Step ST64 may be carried out in the case with the absence of the setting value in the random vehicle of the same kind for the occupant in question held in the memory 47 of the occupant data server apparatus 4. The CPU 45 of the occupant data server apparatus 4 may acquire the physical data regarding the occupant in question acquired in the automobile 2 included in the acquisition request for the provisional setting value.

In step ST65, the CPU 45 of the occupant data server apparatus 4 may acquire, from the memory 47 of the occupant data server apparatus 4, the setting value for the occupant in question in a random automobile of a different kind, i.e., not the same kind, included in the personalized occupant data regarding the occupant in question. Thus, the CPU 45 of the occupant data server apparatus 4 may calculate an amount of correction in the random automobile. The amount of correction may be, for example, an amount of correction in terms of a distance from a reference position 84 set in the automobile 2. In the automobile 2, for example, a position of an engine mount may be set as the reference position 84 in design. Thus, even in a case with a difference in a position of a seat rail 82 between the automobiles 2 of multiple kinds, it is possible to provide the setting values for the seat position in each of the automobiles 2. The setting value indicating the seat position on the seat rail 82 does not allow for conversion between vehicles in a case with a difference in a mounting position of the seat rail 82 itself between the automobiles 2 of the multiple kinds.

In step ST66, the CPU 45 of the occupant data server apparatus 4 may calculate the amount of correction in the automobile 2 related to the processing on the basis of an inter-vehicle difference, i.e., a difference between the reference position 84 in the random automobile acquired from the memory 47 of the occupant data server apparatus 4 and the reference position 84 in the automobile 2 related to the processing.

In step ST67, the CPU 45 of the occupant data server apparatus 4 may make eye level adjustment. The eye level adjustment may be made to allow an eye level of the occupant in question in the automobile 2 related to the processing to correspond to or approach an eye level of the occupant in question in the random automobile acquired from the memory 47 of the occupant data server apparatus 4. This also causes adjustment of the amount of correction in the automobile 2 related to the processing. In the automobiles 2 of different vehicle kinds, for example, a thickness of a seating surface of a seat is often different. Such a difference in the thickness of the seating surface of the seat may cause a deviation of the eye level even for the same automobile 2. Accordingly, it is desirable to carry out the process of step S67, although the process of step ST67 is not necessary. In this example, the CPU 45 may refrain from correcting the amount of correction indicating a longitudinal position of a seat, but adjust the amount of correction indicating a vertical position of the seat and the amount of correction indicating an angle of a backrest of the seat. Thus, the CPU 45 may make the eye level adjustment to allow the eye level in the automobile 2 related to the processing to be equivalent to that in the random automobile.

In step ST68, the CPU 45 of the occupant data server apparatus 4 may generate the provisional setting value for the occupant in question in the automobile 2 related to the processing, on the basis of the amount of correction as a result of the processes of steps ST64 to ST67.

Thus, the CPU 45 is configured to estimate and generate the provisional setting value for the occupant in question in the automobile 2 related to the processing on the basis of the setting value in the random automobile of a different kind held for the occupant in question in the memory 47 of the occupant data server apparatus 4 and the difference in the reference position 84 between the random automobile of the different kind and the automobile 2 related to the processing. In one embodiment of the technology, the CPU 45 may serve as the "provisional generation processor".

Step ST69 is a process provided for a case with a determination in step ST61 of the absence of the personalized occupant data or the setting value for the occupant in question held in the memory 47 of the occupant data server apparatus 4, or a case where the provisional setting value is generated by calculation in the processes of steps ST64 to ST68. In step ST69 and subsequent steps, the CPU 45 may generate the provisional setting value on the basis of setting values for random persons, or verify the provisional setting value already generated by the calculation on the basis of the setting values for random persons. First, the CPU 45 may acquire, from the memory 47 of the occupant data server apparatus 4, a setting value for a random person in a random automobile of the same type as the automobile 2 related to the processing. The CPU 45 may acquire, from the memory 47 of the occupant data server apparatus 4, the setting values for a plurality of the random persons in the random automobiles of the same kind as the automobile 2 related to the processing. The CPU 45 may also acquire the occupant physical data indicating the physical constitutions of the occupants who use the respective setting values.

At this occasion, the memory 47 of the occupant data server apparatus 4 may include the personalized occupant data regarding an employee of the dealer when on board the automobile 2 to be sold by the dealer. Moreover, the memory 47 of the occupant data server apparatus 4 may include dummy occupant data regarding a dummy occupant of a standard physical constitution in designing the automobile 2 related to the processing. In the memory 47 of the occupant data server apparatus 4, the occupant physical data regarding a plurality of random occupants other than the occupant in question related to the processing and the setting values in the automobile 2 to be used by the respective random occupants may be held in associable relation to the respective random occupants. Registering these pieces of data in advance makes it possible for the CPU 45 to acquire the setting values for random persons in random automobiles of the same kind as the automobile 2 related to the processing, from the beginning of sales of the automobile 2 related to the processing to a user.

In step ST70, the CPU 45 of the occupant data server apparatus 4 may create a map of the physical constitution and the amount of correction, to obtain the relation between the occupant physical data acquired in step ST69 and the amount of correction. In the map of the physical constitution and the amount of correction, the physical constitutions of a plurality of occupants and the amounts of correction are mapped.

In step ST71, the CPU 45 of the occupant data server apparatus 4 may determine presence or absence of the pre-generated provisional setting value. In the case where the processes of steps ST64 to ST68 are carried out, the provisional setting value by the calculation has already been generated. In this case, the CPU 45 may determine the presence of the pre-generated provisional setting value, and cause the flow to proceed to step ST72. Meanwhile, in the case where the flow proceeds from step ST61 to step ST69, the provisional setting value has not been generated, and therefore, the CPU 45 may cause the flow to proceed to step ST73.

In step ST72, the CPU 45 of the occupant data server apparatus 4 may compare the pre-generated provisional setting value with the amount of correction for a random person having a similar physical constitution, as evaluation of the pre-generated provisional setting value. The amount of correction for the random person to be compared may be based on the setting value held for the relevant random person in the memory 47 of the occupant data server apparatus 4, or alternatively, the amount of correction for the random person to be compared may be, for example, an average value calculated on the basis of a plurality of the setting values selected from the map of the physical constitution and the amount of correction.

In a case where a difference between the pre-generated provisional setting value and the amount of correction for the random person of the similar physical constitution is smaller than a predetermined threshold, the CPU 45 may determine that the pre-generated provisional setting value has high probability. The CPU 45 may maintain the amount of correction for the occupant in question generated by the calculation in step ST68, as the provisional setting value to be acquired by the automobile 2.

In a case where the difference between the pre-generated provisional setting value and the amount of correction is equal to or greater than the threshold, the CPU 45 may determine that the pre-generated provisional setting value does not have high probability. The CPU 45 may cause the flow to proceed to step ST73.

The threshold may be a fixed value, or alternatively, the threshold may increase or decrease in accordance with a size of a distribution range of the amounts of correction for the random persons of the similar physical constitutions in the map of the physical constitution and the amount of correction.

In step ST73, the CPU 45 of the occupant data server apparatus 4 may acquire the amount of correction for the same physical constitution as, or the similar physical constitution to, the physical constitutions of the occupant related to the processing from the map of the physical constitution and the amount of correction created in step ST70.

The CPU 45 may generate the provisional setting values for the occupant in question in the automobile 2 related to the processing, on the basis of the amount of correction acquired.

Thus, the CPU 45, as the "provisional generation processor", is configured to estimate and generate the provisional setting value for the occupant in question related to the processing in the automobile 2 related to the processing on the basis of the relation between the physical data regarding the random occupants and the setting values in the automobile 2. The physical data regarding the random occupants and the setting values in the automobile 2 are held in the memory 47 of the occupant data server apparatus 4, for the random occupants other than the occupant in question, and for the automobile 2 of the same kind as the automobile 2 related to the processing.

In a case with the absence of the setting value in the automobile 2 of the same kind as the automobile 2 related to the processing where the memory 47 of the occupant data server apparatus 4, the CPU 45 may estimate and generate the provisional setting value for the occupant in question related to the processing in the automobile 2 related to the processing on the basis of the relation between the physical data regarding a plurality of random occupants and the setting values in the automobile 2. The physical data regarding the plurality of the random occupants may be held in the memory 47 of the occupant data server apparatus 4 regardless of the kind of the automobile 2.

Description is given next of a method of generating the provisional setting value by the processing in FIG. 9 on the occasion that a second occupant gets in a second automobile 200, by giving an example of a position of a driver's seat 81. The same applies to, for example, a position of a steering wheel 83.

In this case, the memory 47 of the occupant data server apparatus 4 does not hold the vehicle setting data including the setting value of the seat position in the second automobile 200 for the second occupant. The memory 47 of the occupant data server apparatus 4 holds only the vehicle setting data including the setting value of the seat position in the first automobile 100 for the second occupant. Moreover, the memory 47 of the occupant data server apparatus 4 holds the vehicle setting data including the setting value of the seat position in the first automobile 100 and the vehicle setting data including the setting value of the seat position in the second automobile 200, for a dummy first occupant commonly used in designing the first automobile 100 and the second automobile 200.

Figure 10:
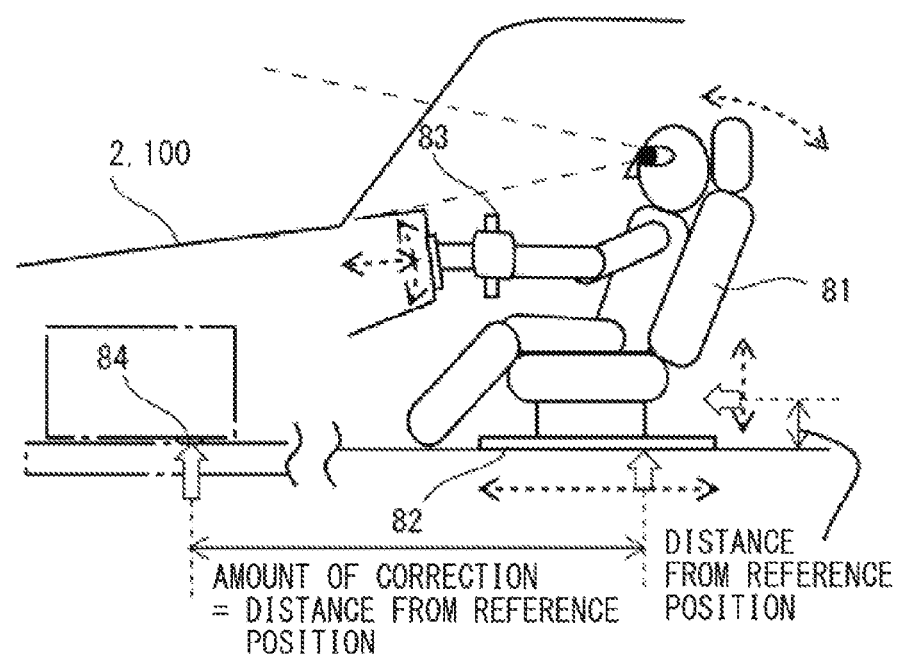
FIG. 10 is a schematic diagram of a seated state of a dummy first occupant of a standard physical constitution as a driver in a first automobile.

FIG. 10 is a schematic diagram of a seated state of the dummy first occupant of a standard physical constitution as a driver on board the first automobile 100.

As denoted by a double arrowed broken line in the first automobile 100, the driver's seat 81 is adjustable longitudinally and vertically along the seat rail 82. A backrest of the driver's seat 81 is adjustable in terms of an angle with respect to a seating surface. The reference position 84 to be set in the first automobile 100 is a position of the engine mount.

The first occupant is seated on the driver's seat 81 in the state illustrated in FIG. 10 and faces forward. This makes it possible for the first occupant to obtain an optimal eye level high enough to keep visibility from being unnecessarily obstructed by, for example, a vehicle body of the automobile 2, and operate the travel of the first automobile 100.

The vehicle memory 22 of the first automobile 100 and the memory 47 of the occupant data server apparatus 4 may hold the setting value indicating a longitudinal position of the driver's seat 81 with the first occupant seated thereon, and the setting value indicating a vertical position of the driver's seat 81 with the first occupant seated thereon.

The arrows in the figure indicate an adjusted position for the first occupant. The double arrowed solid line denotes the amount of correction from the reference position 84 in the first automobile 100 for the first occupant. The amount of correction may be generated from the setting value of the position of the driver's seat 81 in FIG. 10.

Figure 11:
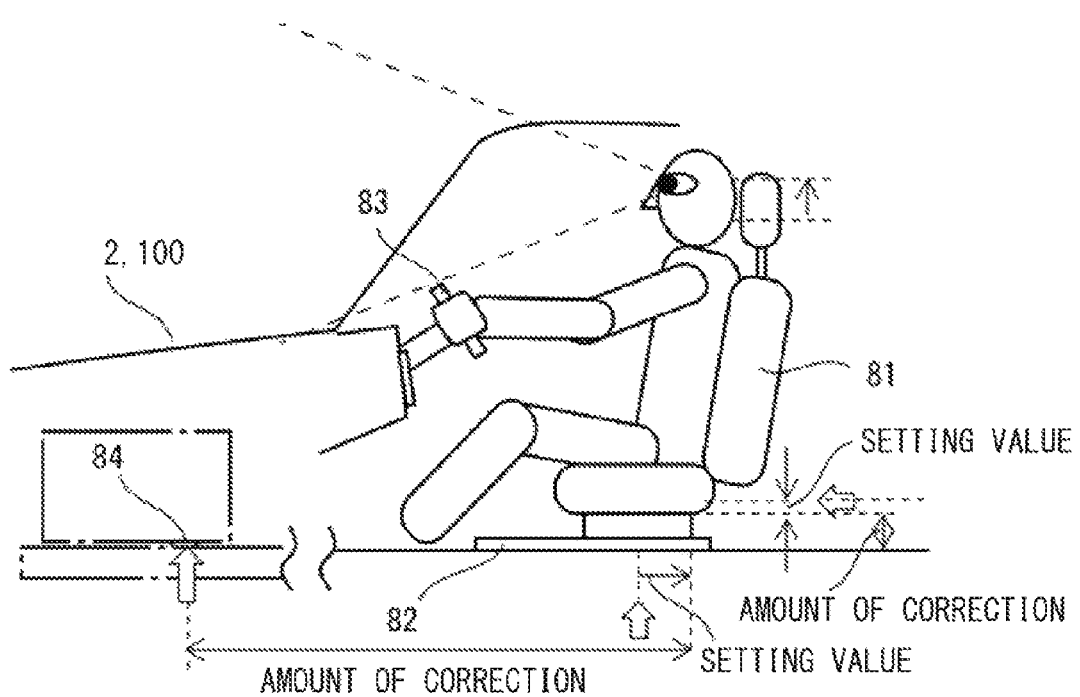
FIG. 11 is a schematic diagram of a seated state of a second occupant different from the first occupant as the driver in the first automobile.

FIG. 11 is a schematic diagram of a seated state of a second occupant different from the first occupant as the driver on board the first automobile 100.

The second occupant is larger in the physical constitution and taller than the first occupant.

Accordingly, the longitudinal position of the driver's seat 81 in the case with the second occupant on board the first automobile 100 is rearward of that of the dummy first occupant. In the vehicle memory 22 of the first automobile 100 and the memory 47 of the occupant data server apparatus 4, the setting value indicating the longitudinal position of the driver's seat 81 with the first occupant seated thereon may be recorded.

The vertical position of the driver's seat 81 in the case with the second occupant on board the first automobile 100 is lower than that of the dummy first occupant. In the vehicle memory 22 of the first automobile 100 and the memory 47 of the occupant data server apparatus 4, the setting value indicating the vertical position of the driver's seat 81 with the first occupant seated thereon may be recorded.

The second occupant is seated on the driver's seat 81 in the state illustrated in FIG. 11 and faces forward. This makes it possible for the second occupant to obtain an optimal eye level high enough to keep visibility from being unnecessarily obstructed by, for example, the vehicle body of the automobile 2, and operate the travel of the first automobile 100. The eye level of the second occupant is higher than that of the first occupant. The second occupant prefers a higher eye level than the first occupant.

As denoted by the double arrowed solid line in the figure, in step ST65 in FIG. 9, the CPU 45 of the occupant data server apparatus 4 may generate the amount of correction from the reference position 84 in the first automobile 100, on the basis of the setting value of the position of the driver's seat 81 for the second occupant described above.

Figure 12:
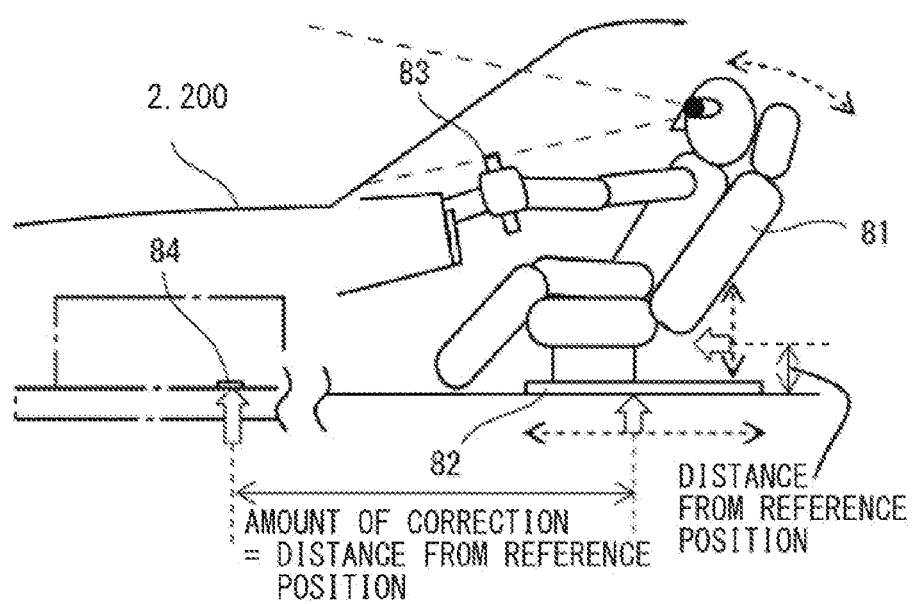
FIG. 12 is a schematic diagram of the seated state of the first occupant as the driver in a second automobile different from the first automobile.

FIG. 12 is a schematic diagram of the seated state of the dummy first occupant as the driver on board a second automobile 200 different from the first automobile 100.

The second automobile 200 is of a different vehicle class and a different kind, and includes a vehicle body of a different size from the first automobile 100. The vehicle body of the second automobile 200 is lower than the vehicle body of the first automobile 100. In a case where the vehicle class of the first automobile 100 and the vehicle class of the second automobile 200 differ greatly, the reference position 84 of the automobile 2 does not assume the position of the engine mount illustrated in the figure but, for example, a position of a right front corner of a cabin or a position of an accelerator pedal or a brake pedal to be operated by the driver. This leads to reduction in influences of different kinds of the automobiles 2 on, for example, a distance from the position of the engine mount to a front surface of the cabin.

The first occupant is seated on the driver's seat 81 in the state illustrated in FIG. 12 and faces forward. This makes it possible for the first occupant to obtain an optimal eye level high enough to keep visibility from unnecessarily obstructed by, for example, the vehicle body of the automobile 2, and operate the travel of the second automobile 200.

In the vehicle memory 22 of the second automobile 200 and the memory 47 of the occupant data server apparatus 4, the setting value indicating the longitudinal position of the seat with the first occupant seated thereon, and the setting value indicating the vertical position of the seat with the first occupant seated thereon may be recorded.

The CPU 45 of the occupant data server apparatus 4 may calculate a difference in the distance, i.e., an inter-vehicle difference between the distance from the reference position 84 to the position of the driver's seat 81 with the first occupant thereon in the first automobile 100 in FIG. 10, and the distance from the reference position 84 to the position of the driver's seat 81 with the first occupant thereon in the second automobile 200 in FIG. 12.

In step ST66 in FIG. 9, with the use of the difference in the distance, i.e., the inter-vehicle difference, the CPU 45 of the occupant data server apparatus 4 may carry out calculation to convert the amount of correction for the second occupant in the first automobile 100 to be obtained from FIG. 11, into the amount of correction for the second occupant in the second automobile 200.

In addition, because of the large physical constitution of the second occupant, the second occupant may possibly not be able to get in the second automobile 200 with the driver's seat 81 upright as illustrated in FIG. 11. To suppress such a situation, in step ST67 in FIG. 9, the CPU 45 of the occupant data server apparatus 4 may adjust the amount of correction on the position of the driver's seat 81 in the second automobile 200 to obtain a predetermined eye level. Even in this case, because the second occupant prefers a higher eye level than the first occupant, the CPU 45 of the occupant data server apparatus 4 may adjust the amount of correction to obtain a higher eye level than the first occupant.

Thus, in step ST68 in FIG. 9, the CPU 45 of the occupant data server apparatus 4 is configured to obtain the amount of correction as the provisional setting value in the second automobile 200 for the second occupant.

Figure 13:
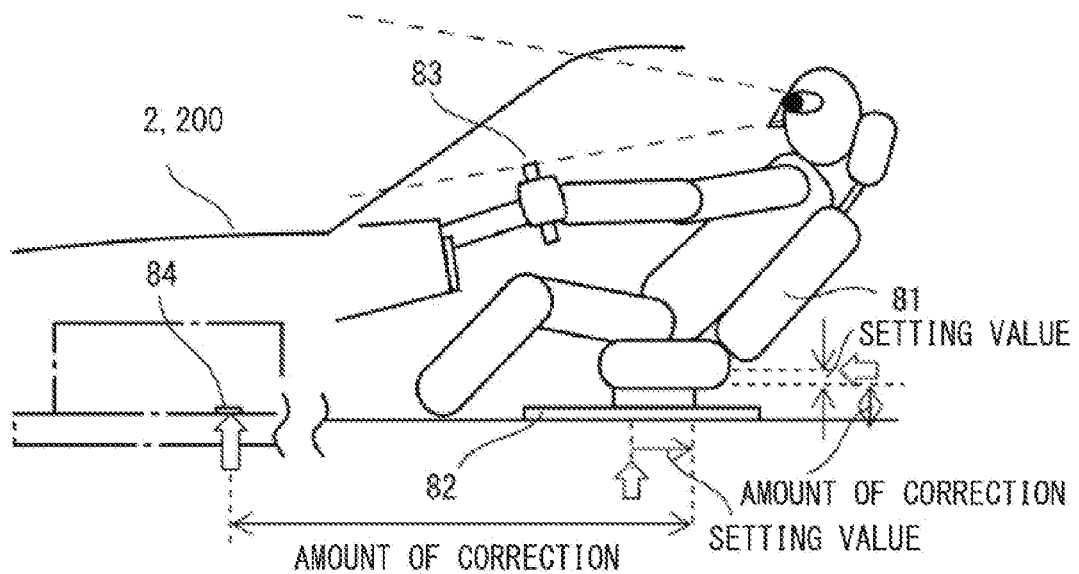
FIG. 13 is a schematic diagram of the seated state of the second occupant as the driver in the second automobile.

FIG. 13 is a schematic diagram of the seated state of the second occupant as the driver on board the second automobile 200.

FIG. 13 illustrates a situation in which the provisional setting value generated in step ST68 in FIG. 9 by the CPU 45 of the occupant data server apparatus 4 is set in the second automobile 200 for the second occupant.

In the case where the second occupant having the larger physical constitution is on board the second automobile 200, the longitudinal position of the driver's seat 81 becomes rearward of that of the dummy first occupant. In the vehicle memory 22 of the second automobile 200 and the memory 47 of the occupant data server apparatus 4, the provisional setting value indicating the longitudinal position of the driver's seat 81 with the second occupant seated thereon may be recorded as the setting value.

Moreover, in the case with the second occupant on board the second automobile 200, the vertical position of the driver's seat 81 becomes lower than that of the dummy first occupant. In the vehicle memory 22 of the second automobile 200 and the memory 47 of the occupant data server apparatus 4, the provisional setting value indicating the vertical position of the driver's seat 81 with the second occupant seated thereon may be recorded as the setting value.

As with FIG. 11, the eye level of the second occupant is higher than that of the first occupant.

The second occupant may make fine adjustment, as appropriate, of the longitudinal position and the vertical position of the driver's seat 81 from the provisionally set positions.

The second occupant is seated on the driver's seat 81 in the state illustrated in FIG. 13 and faces forward. This makes it possible for the second occupant to obtain an optimal eye level high enough to keep visibility from being unnecessarily obstructed by, for example, the vehicle body of the automobile 2, and operate the travel of the second automobile 200, as with the case of the first automobile 100.

As described, the CPU 45 of the occupant data server apparatus 4, as the "provisional generation processor", is configured to estimate and generate the provisional setting value for the seat position, e.g., the longitudinal position and the vertical position, in the automobile 2 related to the processing. The CPU 45 is configured to estimate and generate the provisional setting value, allowing the occupant related to the processing to obtain a desired eye level or a desired seat position in the automobile 2 related to the processing. The CPU 45 of the occupant data server apparatus 4 may estimate and generate the provisional setting value for, without limitation, the position of the steering wheel 83, e.g., the longitudinal position and the vertical position, by similar processing to the forgoing.

Figure 14:
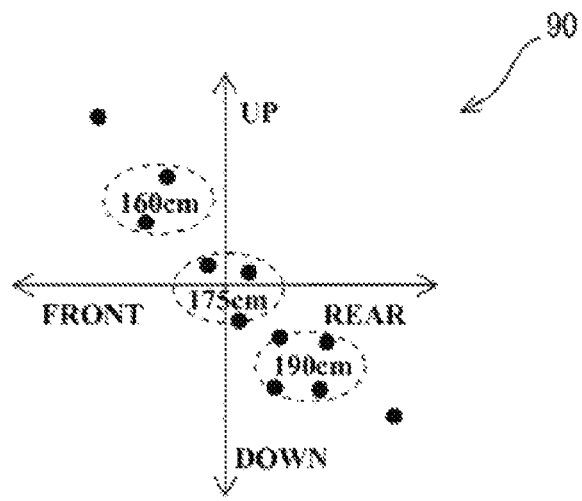
FIG. 14 is a schematic diagram of an example of a relation map between physical constitutions, i.e., occupant physical data, regarding multiple occupants who use automobiles of the same kind, and amounts of correction, i.e., setting values.

FIG. 14 is a schematic diagram of an example of a relation map 90 between the physical constitutions, i.e., the occupant physical data, regarding multiple occupants who use the automobiles 2 of the same kind and amounts of correction, i.e., the setting values.

In step ST69 in FIG. 9, the CPU 45 of the occupant data server apparatus 4 may acquire the occupant physical data indicating the physical constitutions of the multiple occupants, e.g., the height and the seated height, for random automobiles of the same kind as the automobile 2 related to the processing held in the memory 47 of the occupant data server apparatus 4, and the amounts of correction, i.e., the setting values, for the respective occupants. In step ST70, the CPU 45 may generate the relation map 90 between the physical constitutions and the amounts of correction in FIG. 14.

In FIG. 14, the horizontal axis denotes the longitudinal position of the driver's seat 81. The vertical axis denotes the vertical position of the driver's seat 81. The origin may be set at, for example, the position of the driver's seat 81 for the dummy first occupant of the standard physical constitution.

In the relation map 90 between the physical constitutions and the amounts of correction in FIG. 14, the amounts of correction, i.e., the setting values, on the position of the driver's seat 81 for respective ones of the multiple occupants are indicated by a plurality of black dots.

Ellipses in the figure each indicate a group of a plurality of occupants classified by the height. In this example, FIG. 14 illustrates a group of the height of about 160 cm, a group of the height of about 175 cm, and a group of the height of about 190 cm.

In step ST73 in FIG. 9, the CPU 45 of the occupant data server apparatus 4 may acquire the amount of correction for a random person of the same height, or the same physical constitution, as the occupant related to the processing, with the use of the height of the occupant related to the processing. For example, in the case with the occupant of the height of 175 cm, the CPU 45 of the occupant data server apparatus 4 may acquire the amount of correction for a random person at a closest position to the center or the center of gravity of the group of the height of 175 cm in FIG. 14.

Alternatively, in step ST 73 in FIG. 9, the CPU 45 of the occupant data server apparatus 4 may acquire an average value or a representative value of the amounts of correction for the multiple occupants within a predetermined range centered on the height of the occupant related to the processing.

As described, in this embodiment, in the case with the absence of the setting value for the occupant on board the automobile 2 held in the vehicle memory 22 of the automobile 2, or in the case where the setting initialization button or the setting update button is operated by the occupant, the physical data regarding the occupant in question on board the automobile 2 may be acquired or estimated. In the occupant data server apparatus 4, the provisional setting value corresponding to the acquired physical data regarding the occupant in question may be generated. The automobile 2 may acquire the generated provisional setting value from the occupant data server apparatus 4, record the provisional setting value in the vehicle memory 22 in the automobile 2 as the setting value for the occupant related to the processing, and provide the automobile 2 with the setting.

The occupant may sometimes stop using the old automobile 2 they have used so far, e.g., the first automobile 100, and begin using the new automobile 2, e.g., the second automobile 200. The occupant may sometimes use the plurality of automobiles 2, e.g., the first automobile 100 and the second automobile 200. Even in such cases, the occupant physical data regarding the occupant themselves may be acquired or estimated in the new automobile 2 in which the setting value for the occupant is not held in the vehicle memory 22. Hence, it is possible for the occupant to obtain the provisional setting value to be used as the setting value for the occupant themselves, without making the setting operation on their own in the new automobile 2. In particular, because the provisional setting value may be generated with the use of the occupant physical data regarding the occupant themselves, the provisional setting value is expected to make an optimal setting value as with the case where the occupant provides the setting on their own in the new automobile 2. Thus, after the new automobile 2 is provided with the setting of the provisional setting value, it is unnecessary for the occupant to make the setting operation on their own, or alternatively, it is unnecessary from the beginning to make an adjustment operation.

Description now moves on to the automobile 2 and the vehicle setting system 1 for the automobile 2 according to a second embodiment of the technology. In this embodiment, the acquisition control by the occupant data server apparatus 4 is different from that described above. In the following, description is given mainly of differences from those described above.

Figure 15:
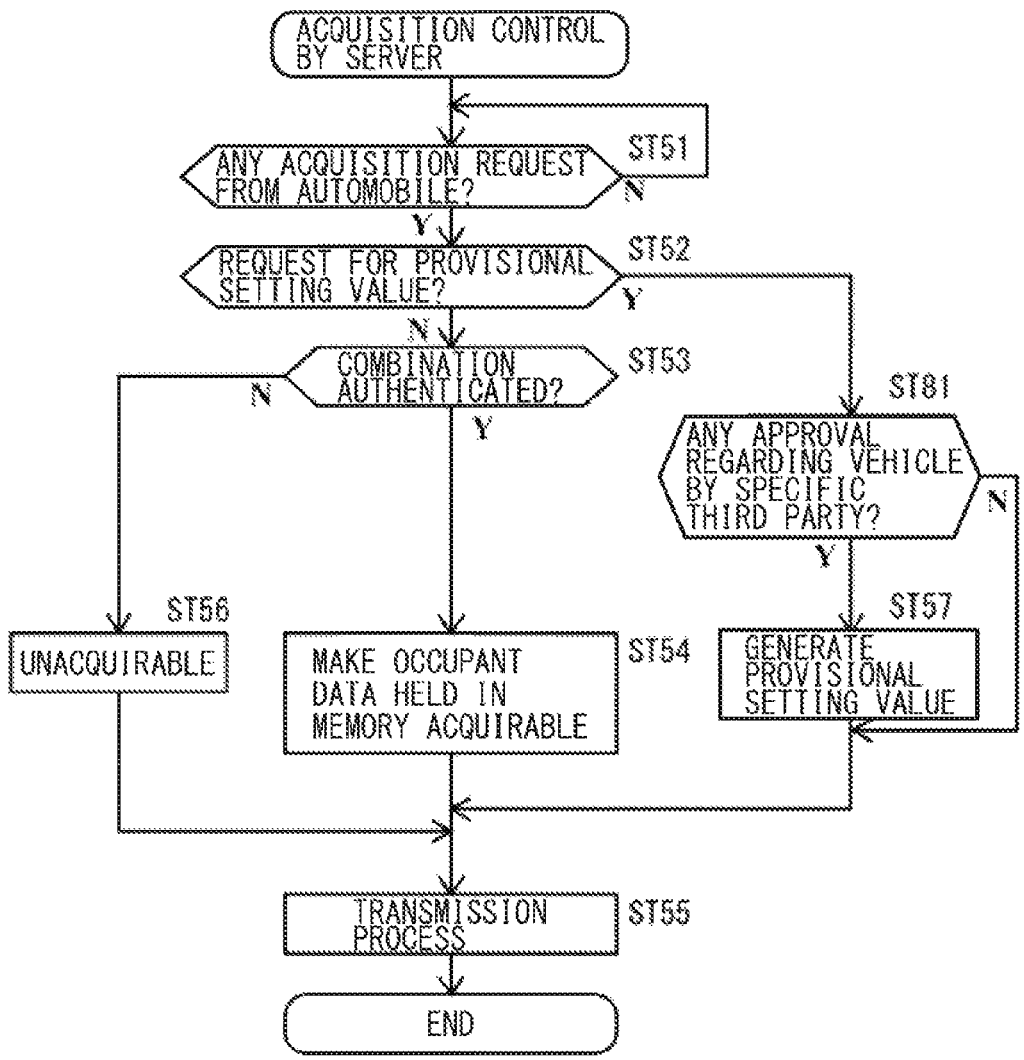
FIG. 15 is a flowchart of an acquisition control of answering the acquisition request from the automobile, by the occupant data server apparatus, according to a second embodiment of the technology.

FIG. 15 is a flowchart of an acquisition control of answering the acquisition request from the automobile 2, by the occupant data server apparatus 4, according to the second embodiment of the technology.

The CPU 45 of the occupant data server apparatus 4, as the acquisition control processor 76, may carry out repetitively the acquisition control in FIG. 15.

The processes of steps ST51 to ST57 in FIG. 15 are similar to those described above, and description thereof is omitted. However, in step ST52, in the case with the determination that the acquisition request from the automobile 2 is to acquire the provisional setting value, the CPU 45 may cause the flow to proceed to step ST81.

In step ST81, the CPU 45 of the occupant data server apparatus 4 may determine presence or absence of an approval, by a specific third party, of the acquisition request from the automobile 2. The specific third party is a third party different from at least the occupant related to the processing. Non-limiting examples of the specific third party may include an employee of a dealer or a car rental company. The specific third party may record the approval by, for example, recording the vehicle identification data regarding the automobile 2 related to the sale or the car rental service in the memory 47 of the occupant data server apparatus 4. In this case, the CPU 45 may determine whether or not the vehicle identification data included in the acquisition request for the provisional setting value is held in advance in the memory 47 of the occupant data server apparatus 4, to determine the presence or the absence of the approval by the specific third party.

In a case with the presence of the approval by the specific third party, the CPU 45 may cause the flow to proceed to step ST57, and generate the provisional setting value. In step ST 55, the CPU 45 may transmit the provisional setting value to the request sender.

In a case with the absence of the approval by the specific third party, the CPU 45 may cause the flow to skip step ST57 and proceed to step ST55. The CPU 45 may transmit a refusal to generate the provisional setting value to the request sender.

Thus, in the case where the combination of the occupant on board the automobile 2 and the automobile 2 is unauthenticated, with the presence of the approval by the specific third party different from the occupant on board the automobile 2, the CPU 45 of the occupant data server apparatus 4 is configured to make the provisional setting values by the vehicle ECU 21 of the automobile 2, as the "provisional acquisition processor", acquirable by the automobile 2.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing embodiments, the automobile 2 includes the biometric authentication processor 71 together with the setting processor 75. The setting processor 75 is configured to provide the setting to make the occupant-dependent setting available in the automobile 2. The biometric authentication processor 71 is configured to authenticate the occupant on board the automobile 2.

In an alternative example, the automobile 2 may include the combination authentication processor 74 together with the setting processor 75 and the biometric authentication processor 71. The combination authentication processor 74 is configured to authenticate the combination of the occupant authenticated by the biometric authentication processor 71 and the automobile 2 with the occupant on board.

In the forgoing embodiments, on the occasion of the registration of a new occupant, the occupant data server apparatus 4 is configured to generate the provisional setting value, and the automobile 2 is configured to acquire the provisional setting value from the occupant data server apparatus 4.

In an alternative example, on the occasion of the registration of a new occupant, the automobile 2 may allow the vehicle ECU 21 to generate the provisional setting value and acquire the provisional setting value. In this case, the vehicle ECU 21 may acquire the data to be involved in the generation of the provisional setting value from the occupant data server apparatus 4, or alternatively, the vehicle ECU 21 may acquire the data to be involved in the generation of the provisional setting value from the vehicle memory 22. However, for example, the vehicle memory 22 of the automobile 2 may possibly have limitation on the capacity, unlike the memory 47 of the occupant data server apparatus 4. In this case, the vehicle ECU 21 may carry out simpler generation processing than the generation processing of the provisional setting value in the occupant data server apparatus 4, to generate the provisional setting value.

The vehicle ECU 21 and the CPU 45 illustrated in FIGS. 2 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle ECU 21 and the CPU 45 illustrated in FIGS. 2 and 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle ECU 21 and the CPU 45 illustrated in FIGS. 2 and 3.

The invention claimed is:

1. A vehicle setting system configured to record, in a vehicle memory of a vehicle, a setting value in accordance with an occupant to be on board the vehicle and provide the vehicle with setting of the setting value, the vehicle setting system comprising:
   a vehicle processor configured to acquire or estimate physical data regarding the occupant on board the vehicle, in response to absence of the setting value for the occupant on board the vehicle held in the vehicle memory of the vehicle;
   a server including:
      a server memory, the server memory being configured to:
         hold the setting value in the vehicle for the occupant related to the processing by the vehicle processor, in associable relation to the physical data regarding the occupant,
         hold the physical data regarding each of occupants including the occupant and the setting value in the vehicle for each of the occupants, in associable relation with the each of the occupants; and
      a provisional generation processor, the provisional generation processor being configured to:
         acquire the physical data regarding the occupant related to processing by the vehicle processor, and
         estimate and generate a provisional setting value in the vehicle for the occupant related to the processing by the vehicle processor based on the acquired physical data, on a basis of relation between the physical data regarding the occupant related to the processing by the vehicle processor and the setting value in the vehicle held in the server memory, and on a basis of relation between the physical data regarding one of the occupants other than the occupant held in the server memory, and the setting value in a random vehicle of a same kind as the vehicle related to the processing by the processor;
   wherein, the vehicle processor is further configured to:
   acquire the provisional setting value generated by the provisional generation processor of the server; and
   record, in the vehicle memory, the provisional setting value acquired by the vehicle processor, as an initial setting value based on the physical data for the occupant related to the processing by the vehicle processor, and provide the vehicle with setting of the initial setting value.

2. The vehicle setting system according to claim 1, wherein
   on a condition that the setting value in the vehicle held for the occupant in the server memory is of a same kind as the vehicle related to the processing by the vehicle processor,
   the provisional generation processor is configured to generate the setting value in the vehicle for the occupant held in the server memory, as the provisional setting value in the vehicle related to the processing by the vehicle processor.

3. The vehicle setting system according to claim 2, wherein
   on a condition that the setting value in the vehicle held for the occupant in the server memory is of a different kind from the vehicle related to the processing by the vehicle processor,
   the provisional generation processor is configured to estimate and generate the provisional setting value in the vehicle related to the processing by the vehicle processor, on a basis of
   a difference between the vehicle for which the setting value is held in the server memory, and the vehicle related to the processing by the vehicle processor.

4. The vehicle setting system according to claim 2, wherein the provisional generation processor is configured to estimate and generate the provisional setting value for a seat position, a steering wheel position, or both in the vehicle related to the processing by the vehicle processor.

5. The vehicle setting system according to claim 2, wherein
the provisional generation processor is configured to obtain a predetermined eye level for the occupant related to the processing by the vehicle processor in the vehicle related to the processing by the vehicle processor.

6. The vehicle setting system according to claim 2, wherein
the server further includes an acquisition control processor, the acquisition control processor being configured to make the setting value for the occupant held in the server memory acquirable by the vehicle, on a condition that a combination of the occupant on board the vehicle and the vehicle is authenticated, and
on a condition that the combination of the occupant on board the vehicle and the vehicle is unauthenticated, the acquisition control processor is configured to make the provisional setting value by the vehicle processor in the vehicle acquirable by the vehicle.

7. The vehicle setting system according to claim 6, wherein
the acquisition control processor is configured to make the provisional setting value by the vehicle processor in the vehicle acquirable by the vehicle, on a condition that the combination of the occupant on board the vehicle and the vehicle is unauthenticated, in response to presence of an approval by a predetermined third party other than the occupant on board the vehicle.

8. The vehicle setting system according to claim 1, wherein
on a condition that the setting value in the vehicle held for the occupant in the server memory is of a different kind from the vehicle related to the processing by the vehicle processor,
the provisional generation processor is configured to estimate and generate the provisional setting value in the vehicle related to the processing by the vehicle processor, on a basis of:
relation between the physical data regarding the occupant held in the server memory, and the setting value in the vehicle held in the server memory; and
a difference between the vehicle for which the setting value is held in the server memory, and the vehicle related to the processing by the vehicle processor.

9. The vehicle setting system according to claim 1, wherein
the provisional generation processor is configured to estimate and generate the provisional setting value for a seat position, a steering wheel position, or both in the vehicle related to the processing by the vehicle processor.

10. The vehicle setting system according to claim 1, wherein
the provisional generation processor is configured to obtain a predetermined eye level for the occupant related to the processing by the vehicle processor in the vehicle related to the processing by the vehicle processor.

11. The vehicle setting system according to claim 1, wherein the server is further configured to include an acquisition control processor, the acquisition control processor being configured to make the setting value for the occupant held in the server memory acquirable by the vehicle, on a condition that a combination of the occupant on board the vehicle and the vehicle is authenticated, and
on a condition that the combination of the occupant on board the vehicle and the vehicle is unauthenticated, the acquisition control processor is configured to make the provisional setting value by the vehicle processor in the vehicle acquirable by the vehicle.

12. The vehicle setting system according to claim 11, wherein
the acquisition control processor is configured to make the provisional setting value by the vehicle processor in the vehicle acquirable by the vehicle, on a condition that the combination of the occupant on board the vehicle and the vehicle is unauthenticated, in response to presence of an approval by a predetermined third party other than the occupant on board the vehicle.

13. A vehicle configured to be provided with occupant-dependent setting, the vehicle comprising:
a vehicle memory configured to hold a setting value to be set in the vehicle in accordance with an occupant to be on board the vehicle;
a vehicle processor configured to:
acquire the setting value for the occupant on board the vehicle from the vehicle memory and provide the vehicle with setting of the setting value;
acquire or estimate physical data regarding the occupant on board the vehicle in response to absence of the setting value for the occupant on board the vehicle held in the vehicle memory of the vehicle; and
acquire a provisional setting value generated based on the physical data for the occupant on board the vehicle, wherein the provisional setting value is generated on a basis of relation between the physical data regarding the occupant related to the processing by the vehicle processor and the setting value in the vehicle configured to be held in a server memory, and on a basis of relation between physical data regarding one of occupants other than the occupant configured to be held in the server memory, and the setting value in a random vehicle of a same kind as the vehicle related to the processing by the processor; and
record, in the vehicle memory, the provisional setting value acquired by the vehicle processor, as an initial setting value based on the physical data for the occupant, and provide the vehicle with setting of the initial setting value.

14. A vehicle configured to be provided with occupant-dependent setting, the vehicle comprising:
a vehicle memory configured to hold a setting value to be set in the vehicle in accordance with an occupant to be on board the vehicle; and
circuitry configured to
acquire the setting value for the occupant on board the vehicle from the vehicle memory and provide the vehicle with setting of the setting value,
acquire physical data regarding the occupant on board the vehicle and generate a provisional setting value for the occupant based on the acquired physical data;
acquire the provisional setting value for the occupant on board the vehicle, in response to absence of the setting value for the occupant on board the vehicle held in the vehicle memory, wherein the provisional setting value is generated on a basis of relation between the physical data regarding the occupant related to the processing by the vehicle processor and the setting value in the vehicle configured to be held in a server memory, and on a basis of relation between physical data regarding one of occupants other than the occupant configured to be held in the server memory, and the setting value in a random vehicle of a same kind as the vehicle related to the processing by the processor; and the circuitry is configured to record the acquired provisional setting value in the vehicle memory as an initial setting value based on the physical data for the occupant, and provide the vehicle with setting of the initial setting value.

* * * * *